US008340317B2

(12) United States Patent
Pfaffinger et al.

(10) Patent No.: US 8,340,317 B2

(45) Date of Patent: Dec. 25, 2012

(54) STEREO AUDIO-SIGNAL PROCESSING SYSTEM

(75) Inventors: Gerhard Pfaffinger, Regensburg (DE); Markus Christoph, Straubing (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 999 days.

(21) Appl. No.: 10/842,056

(22) Filed: May 6, 2004

(65) Prior Publication Data

US 2005/0008170 A1 Jan. 13, 2005

(30) Foreign Application Priority Data

May 6, 2003 (EP) .................................... 03010208

(51) Int. Cl.

*H04B 15/00* (2006.01)
*H04R 27/00* (2006.01)
*H04R 3/00* (2006.01)

(52) U.S. Cl. ................. 381/93; 381/83; 381/95; 381/96

(58) Field of Classification Search .................... 381/17, 381/58–59, 93, 95–96, 83, 318, 66

See application file for complete search history.

(56) References Cited

U.S. PATENT DOCUMENTS

| | | | | |
|---|---|---|---|---|
| 4,118,601 | A | 10/1978 | Yeap | 179/1 |
| 4,306,113 | A | 12/1981 | Morton | 179/1 |
| 4,340,780 | A | 7/1982 | Odlen | 179/1 |
| 4,709,391 | A | 11/1987 | Kaizer et al. | 381/98 |
| 4,823,391 | A | 4/1989 | Schwartz | 381/103 |
| 4,893,342 | A | 1/1990 | Cooper et al. | 381/26 |
| 4,910,779 | A | 3/1990 | Cooper et al. | 318/26 |
| 4,975,954 | A | 12/1990 | Cooper et al. | 381/26 |
| 5,034,983 | A | 7/1991 | Cooper et al. | 381/25 |
| 5,136,651 | A | 8/1992 | Cooper et al. | 381/25 |
| 5,333,200 | A * | 7/1994 | Cooper et al. | 381/1 |
| 5,680,450 | A * | 10/1997 | Dent et al. | 379/406.08 |
| 5,694,476 | A * | 12/1997 | Klippel | 381/96 |
| 5,852,667 | A | 12/1998 | Pan et al. | |
| 6,760,451 | B1 * | 7/2004 | Craven et al. | 381/98 |

(Continued)

FOREIGN PATENT DOCUMENTS

DE 10027618 1/2001

(Continued)

OTHER PUBLICATIONS

Jorg Kliewer, “Beitrage zum Entwurf modulierter Filterbanke fur verschiedene Teilbandabtastraten” [On designing modulated filter banks for different sub-band sampling rates], PhD thesis, Shaker Publishers, 1999, vol. 16.

Weiss et al.: “A Subband Adaptive Equalization Structure”, IEEE Colloquium Novel DSP Algorithms and Architectures for Radio Systems, Sep. 28, 1999, pp. 4-1.

Harma et al.: “Frequency-Warped Signal Processing for Audio Applications”, Journal of the Audio Engineering Society, vol. 48, No. 11, Nov. 2000, pp. 1011-1031.

(Continued)

*Primary Examiner* — Yuwen Pan
*Assistant Examiner* — George Monikang
(74) *Attorney, Agent, or Firm* — O’Shea Getz P.C.

(57) ABSTRACT

An audio processing system is provided for controlling the acoustics of a loudspeaker-room system. The loudspeaker-room system having a listening room and loudspeakers located in said listening room, and transfer functions with linear and non-linear components. The audio processing system comprises a compensator with a transfer function for obtaining at least two compensated signals from the input signals. The transfer functions of the compensator may include linear and non-linear components and are inverse to the transfer functions of the loudspeaker-room system to the extent that a desired overall transfer function is established.

61 Claims, 22 Drawing Sheets

U.S. PATENT DOCUMENTS

| | | | |
|---|---|---|---|
| RE40,281 | E | 4/2008 | Tzannes et al. |
| 2004/0131203 | A1 | 7/2004 | Liljeryd et al. |
| 2004/0268203 | A1 | 12/2004 | Koyata |
| 2005/0157891 | A1 | 7/2005 | Johansen |
| 2005/0271216 | A1 | 12/2005 | Lashkari |

FOREIGN PATENT DOCUMENTS

| | | |
|---|---|---|
| EP | 0687126 | 12/1995 |
| WO | WO 02/056635 | 7/2002 |

OTHER PUBLICATIONS

Neely et al.: "Invertibility of a Room Impulse Response", Journal of the Acoustical Society of America, vol. 66, No. 1, Jul. 1979, pp. 165-169.

Miyoshi et al.: "Inverse Filtering of Room Acoustics", IEEE Transactions on Acoustics, vol. 36, No. 2, Feb. 1, 1988, pp. 145-152.

* cited by examiner

STEREO AUDIO-SIGNAL PROCESSING SYSTEM

CLAIM OF PRIORITY

This patent application claims priority to European Application EP 03 010 208.1 filed on May 6, 2003.

FIELD OF THE INVENTION

This invention relates to the field of loudspeakers, and in particular to the field of audio-signal processing and more particularly to a stereo audio-signal reproduction system, which provides improved sound-source imaging and accurate perception of desired source-environment acoustics.

RELATED ART

In high fidelity sound reproduction systems, the sound reaching the listener should conform as precisely as possible to the supplied source signal, or in accordance with a desired acoustics or sound behavior. The impact of current solid state technology in this field has been such that the electronic components, themselves, add very little coloration to the audio signals being processed.

The same cannot be said, however, for the final steps in the sound reproduction process. Both the high fidelity speakers which actually generate the acoustics signals and the listening environment in which the signals are propagated significantly influence the reproduced sounds, with the latter being the predominant influence of the two. In particular small rooms such as vehicle cabins generally have a poor acoustic behavior resulting in unwanted alterations of the sound being reproduced.

The difficulty with the listening environment arises from the difference in its responses to different frequency sounds. Some listening environments may be quite lively, providing multiple reflections of different frequency components, whereas others may be quite dead, providing substantial damping of some frequency components. In either case the frequency versus amplitude functions of the reproduced sound will be altered. The nature and extent of the alteration will thus vary from listening environment to listening environment, even if the same electronic and speaker components are employed in all cases.

To reduce the influence of the listening environment upon the audio signal, it has become popular to introduce modifications in the frequency response functions of the audio system which compensate for the colorations introduced by the listening environment. This is generally accomplished by a manually controlled audio equalizer that is interposed in the audio signal path between the signal source and the speakers.

U.S. Pat. No. 4,118,601 discloses a system and a method of electronically equalizing the composite transfer function of a sound system and a room that receives the sound generated by the sound system. A test signal, such as white or pink noise, is applied to the sound system and a microphone for receiving the reference sound is placed in the room and has its output applied to an equalizer that comprises a plurality of contiguous narrow band filters covering the entire audio band. Each output signal from the filters is applied through an adjustable amplitude control mechanism to a detector and each detected output signal is compared with a reference signal, such as the detected output signal from a selected mid-range filter and has its amplitude adjusted to provide a desired relationship with respect to the reference signal. After adjustment of the equalizer, the test signal and the microphone are disconnected from the system and the sound signal source is applied through the equalizer to the loudspeaker system.

U.S. Pat. No. 4,306,113 provides a method for correcting errors in the overall reproduction functions of an audio system installed in a room. The method includes the steps of generating a test signal as an input to the audio system and converting the resulting sound generated by the system and its room environment into stored data whose values are a function of the sound. This stored data is utilized to fix the functions of an equalizer such that when it is installed in an audio system, it will give the desired correction to the output thereof.

U.S. Pat. No. 4,340,780 discloses a self-correcting audio equalizer for use in a high fidelity sound reproduction system. The equalizer responds to the audio signal to provide an equalized audio signal to a sound reproducing device for generating a corresponding acoustic signal. The equalizer includes dynamically measuring the differences between the frequency versus amplitude functions of the audio and acoustic signals. Another unit automatically adjusts the frequency versus amplitude functions of the equalized audio signal so that the measured differences are reduced. The adjustment of the equalizer thus takes place automatically and substantially continuously during normal operation of the system.

U.S. Pat. No. 4,823,391 proposes a sound reproduction system for automatically adjusting the output functions of a speaker or speakers in response to the acoustical functions of the external environment for the speakers by the use of sensors operatively connected to a microprocessor, which in turn is connected to further processing in a digital preamplifier which processing includes comparison of data received from the sensor about the environment and the audio signal treatment by the environment and alters the output of the digital preamplifier to compensate for the environment and changes in the environment.

U.S. Pat. Nos. 4,893,342; 4,910,779; 4,975,954; 5,034,983; 5,136,651 and 5,333,200 disclose a stereo audio processing system for a stereo audio signal processing system that provides improved source imaging and simulation of desired listening environment acoustics while retaining relative independence of listener movement. The system first utilizes a synthetic or artificial head microphone pickup and utilizes the results as inputs to a cross-talk cancellation and naturalization compensation unit utilizing minimum phase filter units to adapt the head diffraction compensated signals for use as loudspeaker signals. The system provides for head diffraction compensation including cross-coupling while permitting listener movement by limiting the cross-talk cancellation and diffraction compensation to frequencies substantially below approximately ten kilohertz.

As can be seen from the above, a desired sound characteristic is achieved by a sound processing system in combination with at least N+1 loudspeakers and at least N microphones arranged in any room. However, this arrangement works only properly at certain sound levels of the loudspeakers since the loudspeakers have a non-linear transfer behavior that negatively effects the known sound processing systems in particular at higher sound levels.

U.S. Pat. No. 5,694,476 discloses an arrangement for converting an electric signal into an acoustic signal comprising a loudspeaker, a linear or nonlinear filter with controllable parameters, a sensor, a controller, a reference filter and a summer. The filter is adaptively adjusted to compensate for the linear and/or nonlinear distortions of the loudspeaker and to realize a desired overall transfer function of the loudspeaker. The filter supplies a gradient signal to the controller and a control input. The summer provides an error signal derived from output signals of the sensor output and a reference filter. The controller filters the gradient signal and/or the error signal, and produces a control signal to update every filter parameter. This arrangement also adapts on-line for changing loudspeaker characteristics caused by temperature, aging and so on. However, this arrangement compensates only the transfer function of the loudspeaker itself but not the loudspeaker-room system at all. Moreover, the arrangement works only with mono signals and not with stereo signals.

An object of the invention is to provide an audio processing system that effects both the linear and the non-linear components of the transfer function of a loudspeaker-room system.

SUMMARY

An audio processing system for controlling the acoustics of a loudspeaker-room system that has a listening room and loudspeakers located in the listening room, and a transfer function with linear and non-linear components, provides enhanced sound-imaging localization that is relatively independent of listener position at all sound levels. The audio processing system comprises two input signals and includes a compensator comprising transfer functions for obtaining at least two compensated signals from the input signals. The transfer functions of the compensator include linear and non-linear components and are inverse to the transfer functions of the loudspeaker-room system to the extent that a desired overall transfer function is established. An output signal is provided based upon the compensated signals, and the output signals are fed to the loudspeakers. The loudspeakers are arranged and electrically coupled in at least two sets of loudspeakers, and each of the output signals is supplied to a respective set of loudspeakers. Each of the sets of loudspeakers comprises at least one loudspeaker.

At least two microphones may be located within the listening room to provide feedback signals to the compensator. The number of sets of loudspeakers may be equal or higher than the number of microphones.

The compensator may comprise a linear compensation unit with linear transfer functions forming the linear components of the transfer functions of the compensator. The linear compensator introduces cross-talk cancellation in the two input signals and includes a difference filter for filtering a difference of the two input signals to obtain a first filtered signal and a sum filter for filtering a sum of the two input signals to obtain a second filtered signal. The linear compensation unit generates a sum output signal and a difference output signal respectively from the filtered signals, and generating at least one additional different output signal from the filtered signals. Compensated signals are generated from the at least three filtered signals.

The input signals may be reformatted into binaural signals. The stereo audio signals may be conventional stereo signals having a predetermined loudspeaker bearing angle. The difference filter and sum filter may be configured to reformat the binaural signals into output signals that simulate a selected different loudspeaker bearing angle.

The audio processing system sum filter and difference filter may comprise minimum phase filters.

The cross-talk canceller may comprise a naturalizer for providing naturalization compensation of the audio signals to correct for propagation path distortion comprising two substantially identical minimum phase filters to compensate each of the binaural signals.

The difference filter and the sum filter may be made to have a predetermined deviation from reciprocals of corresponding difference and sum head related transfer functions, the deviation may be introduced to avoid representing transfer function functions peculiar to specific heads in order to provide compensation suitable for a variety of listener's heads.

The difference filter and the sum filter may be made to have a predetermined deviation from reciprocals of corresponding difference and sum head related transfer functions, the deviation imposed gradually and being slight at a predetermined starting frequency and becoming more substantial at higher frequencies.

The crosstalk canceller may also non-symmetrical compensate the output signals. The non-symmetrical compensator may comprise an equalizer that provides non-symmetrical equalization adjustment of one of the output signals relative to a second uncompensated one of the output signals using head-diffraction data for a selected bearing angle to provide a virtual loudspeaker position.

Alternatively, the non-symmetrical compensator may also comprise a non-symmetrical delay and a level adjustment of the output signals.

The loudspeakers may be arranged in three sets of loudspeakers. Two side loudspeaker outputs may be provided from the first filtered signal, one of which is a polarity reversed version of the other side loudspeaker output signal, and the center loudspeaker output is produced from the second filtered signal.

The loudspeakers may be arranged in four sets of loudspeakers, wherein the output means produces two side loudspeaker output signals from the first filtered signal one of which is a polarity reversed version of the other side loudspeaker output signal, and wherein the means for producing a center loudspeaker output further comprises means for producing first and second center loudspeaker output signals from the second filtered signal each of which is substantially similar to the other.

The audio processing system may further comprise means for selecting a level of contribution of the second filtered signal to the center loudspeaker output signal; means for altering the filtering of the second filtered signal to form a third filtered signal; and means for selecting a level of contribution of the third filtered signal in the side loudspeaker output signals in a manner complementary to a corresponding contribution in the center loudspeaker output signal which contribution of the third filtered signal comprises together with the first filtered signal the two side output loudspeaker signals.

The selecting a level of contribution may be frequency dependent in relation to responses of transmission paths of loudspeaker outputs so as to avoid extremes of compensation.

The compensator may comprise a linear compensation unit with linear transfer functions forming the linear components of the transfer functions of the compensator; the linear compensation unit comprises at least two adaptive filters controlled by the feed back signals.

The compensator may comprise a non-linear compensation unit with non-linear transfer functions forming the non-linear components of the transfer functions of the compensator; said non-linear compensation unit may comprise at least two non-linear loudspeaker-modelling units.

The compensator may comprise a non-linear compensation unit with non-linear transfer functions forming the non-linear components of the transfer functions of the compensator; the non-linear compensation unit may comprise at least two non-linear loudspeaker-modelling units controlled by the feed back signals.

The non-linear compensation unit may comprise a loudspeaker-modelling filter with controllable filter parameters.

The compensator may comprise a non-linear compensation unit with non-linear transfer functions forming the non-linear components of the transfer functions of the compensator; the non-linear compensation unit may comprise a correction filter with non-linear transfer functions introducing the non-linear transfer function in the two input signals; the correction filter comprises filter parameters, inputs for controlling the filter parameters, and a gradient output for providing a gradient signal; a sensing unit comprising error outputs for providing error signals having an amplitude; the error signals correspond to the deviation of the instantaneous non-linear transfer function of the correction filter connected with one of the sets of loudspeakers from the non-linear component of the desired overall transfer function; and a controller having error inputs connected to the error outputs of the sensing unit and having for every filter parameter of the correction filter a gradient input and control output; every the gradient input being connected to a corresponding one of the gradient outputs and every the controller output being connected to a corresponding one of the control inputs for generating a control signal to adjust adaptively the corresponding filter parameters of the correction filter and for reducing the amplitude of the error signal.

The compensator may comprise a non-linear compensation unit with non-linear transfer functions forming the non-linear components of the transfer functions of the compensator; the non-linear compensation unit may comprise a correction filter with non-linear transfer functions introducing the non-linear transfer function in the two input signals; the correction filter comprises filter parameters, inputs for controlling the filter parameters, and a gradient output for providing a gradient signal; a sensing unit comprising error outputs for providing error signals having an amplitude; the error signals correspond to the deviation of the instantaneous non-linear transfer function of the correction filter connected with one of the sets of loudspeakers from the non-linear component of the desired overall transfer function; the sensing unit is supplied with the feedback signal provided by the at least two microphones are located within the listening room; and a controller having error inputs connected to the error outputs of the sensing unit and having for every filter parameter of the correction filter a gradient input and control output; every the gradient input being connected to a corresponding one of the gradient outputs and every the controller output being connected to a corresponding one of the control inputs for generating a control signal to adjust adaptively the corresponding filter parameters of the correction filter and for reducing the amplitude of the error signal.

The controller may comprise for every filter parameter of the correction filter one update unit having a first update input and a second update input and an update output; the update output is connected via the controller output to the control input for adjusting the corresponding filter parameters of the correction filter.

The controller may also comprise for every filter parameter of the correction filter one gradient filter having an input and an output; the gradient inputs may be connected via the gradient filters to the first update inputs for providing filtered gradient signals to the update unit and for adjusting the filter parameters; and the error inputs may be connected to the second update inputs for providing the error signals for the update unit.

The controller may also comprise an error filter having an input connected to the error input and an output connected to the second update input for providing a filtered error signal for the update unit contained in the controller; and every the gradient input may be connected to a corresponding one of the first update inputs of the update unit for adjusting the filter parameters.

The controller may also comprise an error filter having an input connected to the error input and an output connected to the second update input for providing a filtered error signal for all the update unit contained in the controller. The controller may also comprise for every the filter parameter one gradient filter having an input and an output, and every the gradient input may be separately connected via the gradient filter to the first update input for providing a filtered gradient signal to corresponding the update unit and for adjusting the filter parameter.

The update unit may comprise a multiplier having a input connected to the first update input, another input connected to the second update input and a multiplier output for providing the product of both input signals; and an integrator having an input connected to the multiplier output and an output connected to the output of the update unit for realizing a Least-Mean-Square update algorithm.

The controller of the audio processing system according to the invention may also comprise: a linear adaptive filter having a model filter input, a model filter output and a model filter error input for adaptively modelling the transducer-sensor-system, the model filter input being connected to the electric input of the transducer; a summer having an inverting and a non-inverting input and a summer output for producing a second error signal, the output of the linear adaptive filter being connected to one input of the summer, the output of the transducer-sensor-system being connected to the other input of the summer and the summer output being connected to the model filter error input; and connections from the linear adaptive filter to the gradient filter for copying the parameters of the linear adaptive filter to every the gradient filter contained in the controller and for adaptively compensating for the transfer function of the transducer-sensor-system on-line.

The controller may also comprise a linear adaptive filter having a model filter input, a model filter output and a model filter error input for adaptively modelling the inverse transducer-sensor-system, the model filter input being connected to the output of the transducer-sensor-system; a summer having an inverting and a non-inverting input and a summer output for producing a second error signal, the model filter output being connected to one input of the summer, the electric input of the transducer being connected to the other input of the summer and the summer output being connected to the model filter error input; and connections from the linear adaptive filter to the error filter for copying the parameters of the linear adaptive filter into the error filter and for adaptively compensating the transfer function of the transducer-sensor-system on-line.

Further, the controller may also comprise a linear adaptive filter having a model filter input, a model filter output and a model filter error input for adaptively modelling the inverse transducer-sensor-system without dedicated off-line pre-training, the model filter input being connected to the output of the transducer-sensor-system; a delay circuit having an input and an output for delaying the electric input signal of the transducer; a summer having an inverting and a non-inverting input and a summer output for producing a second error signal, the model filter output being connected to one input of the summer, the electric input of the transducer being connected via the delay circuit to the other input of the summer and the summer output being connected with the model filter error input; and connections from the linear adaptive filter to the error filter for copying the parameters of the linear adaptive filter into the error filter and for adaptively compensating the transfer function of the transducer-sensor-system on-line.

The sensing unit may comprise a reference filter having an input connected to the filter input and a reference filter output for producing a desired signal from the input signal; a sensor having a sensor output for providing a mechanic, an acoustic or an electric signal of the transducer; and a summer having an inverting input connected to the sensor output, a non-inverting input connected to the reference filter output and an output connected to the error output for providing the error signal for the controller.

The correction filter may comprise an input unit having an input connected to the filter input; also having for every the filter parameter an output connected to corresponding the gradient output for providing a gradient signal; a controllable amplifier for every the filter parameter having a signal input also connected to the output of the input unit, a gain control input connected to the control input and an amplifier output for providing a scaled gradient signal; and an output unit having an input for every the filter parameter and an output connected to the filter output; every the amplifier output being connected to corresponding input of the output unit; a sensing unit having an error output for providing an error signal, the error signal describing the deviation of the instantaneous overall transfer function of the filter connected with the transducer from the desired overall transfer function; and a controller having an error input connected to the error output, the controller also having for every the filter parameter a gradient input and control output, every the gradient input being connected to corresponding the gradient output and every the controller output being connected to corresponding the control input for generating a control signal to adjust adaptively corresponding the filter parameter and for reducing the amplitude of the error signal.

An audio processing method for controlling the acoustics of a loudspeaker-room system may comprise the steps of providing two input signals; obtaining at least two compensated signals from the input signals according to transfer functions; the transfer functions have linear and non-linear components and are inverse to the transfer functions of the loudspeaker-room system to the extent that a desired overall transfer function is established; and producing output signals from at least two of the compensated signals; the output signals are fed to the loudspeakers; wherein the loudspeakers are arranged and electrically coupled in at least two sets of loudspeakers, and each of the output signals is supplied to a respective set of loudspeakers; each of the sets of loudspeakers comprises at least one loudspeaker.

The at least two microphones may be located within the listening room for providing feedback signals to the compensator, and the number of sets of loudspeakers may be higher than the number of microphones.

The audio processing method may further comprise the steps of introducing cross-talk cancellation in the two input signals by filtering a difference of the two input signals to obtain a first filtered signal and filtering a sum of the two input signals to obtain a second filtered signal; generating a sum output signal and a difference output signal respectively from the filtered signals, and generating at least one additional different output signal from the filtered signals; and producing compensated signals from the at least three filtered signals.

The step of providing two input signals comprises reformatting stereo audio signals into binaural signals.

The stereo audio signals may be conventional stereo signals having a predetermined loudspeaker bearing angle and wherein the binaural signals are reformatted into output signals which simulate a selected different loudspeaker bearing angle.

The sum and difference filtering may include minimum phase filtering.

The step of cross-talk cancellation may include providing naturalization compensation of the audio signals to correct for propagation path distortion comprising two substantially identical minimum phase filtering steps to compensate each of the binaural signals.

Difference filtering and sum filtering may have a predetermined deviation from reciprocals of corresponding difference and sum head related transfer functions, the deviation being introduced to avoid representing transfer function functions peculiar to specific heads in order to provide compensation suitable for a variety of listener's heads.

Difference filtering and the sum filtering may have a predetermined deviation from reciprocals of corresponding difference and sum head related transfer functions.

The step of providing crosstalk cancellation may further comprise non-symmetrical compensation of the output signals; the deviation being introduced to avoid representing transfer function functions peculiar to specific heads in order to provide compensation suitable for a variety of listener's heads.

Non-symmetrical compensation may comprise equalization for providing non-symmetrical equalization adjustment of one of the output signals relative to a second uncompensated one of the output signals using head-diffraction data for a selected bearing angle to provide a virtual loudspeaker position.

Non-symmetrical compensation may further comprise non-symmetrical delaying and level adjusting of the output signals.

The loudspeakers may be arranged in three sets of loudspeakers; the method may further comprise the step of producing two side loudspeaker outputs from the first filtered signal one of which is a polarity reversed version of the other side loudspeaker output signal, and the center loudspeaker output may be produced from the second filtered signal.

The loudspeakers may be arranged in four sets of loudspeakers; the method may further comprise the steps of producing two side loudspeaker output signals from the first filtered signal one of which is a polarity reversed version of the other side loudspeaker output signal, and wherein the step of producing a center loudspeaker output further comprises producing first and second center loudspeaker output signals from the second filtered signal each of which is substantially similar to the other.

The audio processing method may further comprise the steps of selecting a level of contribution of the second filtered signal to the center loudspeaker output signal; altering the filtering of the second filtered signal to form a third filtered signal; and selecting a level of contribution of the third filtered signal in the side loudspeaker output signals in a manner complementary to a corresponding contribution in the center loudspeaker output signal which contribution of the third filtered signal comprises together with the first filtered signal the two side output loudspeaker signals.

Selecting a level of contribution may be frequency dependent in relation to responses of transmission paths of loudspeaker outputs so as to avoid extremes of compensation.

The compensation step may comprise a linear compensation step with linear transfer functions forming the linear components of the transfer functions of the compensator; the linear compensation step may comprise at least two adaptive filtering steps controlled by the feed back signals.

The compensation step comprises a non-linear compensation step with non-linear transfer functions forming the non-linear components of the transfer functions of the compensator; the non-linear compensation step comprises at least two adaptive filtering steps controlled by the feed back signals.

The compensation step may comprise a non-linear compensation step with non-linear transfer functions forming the non-linear components of the transfer functions of the compensator; the non-linear compensation step may comprise at least two non-linear loudspeaker-modelling steps controlled by the feed back signals.

The non-linear compensation step may comprise loudspeaker-modelling filtering with controllable filter parameters.

The compensation step may comprise a non-linear compensation step with non-linear transfer functions forming the non-linear components of the transfer functions of the compensator; the non-linear compensation step may comprise a correction filtering step with non-linear transfer functions introducing the non-linear transfer function in the two input signals; the correction filtering comprises filter parameters, inputs for controlling the filter parameters, and a gradient output for providing a gradient signal; a sensing step for providing error signals having an amplitude; the error signals may correspond to the deviation of the instantaneous non-linear transfer function of the correction filtering for one of the sets of loudspeakers from the non-linear component of the desired overall transfer function; and a controlling step with error inputs being formed by the error outputs of the sensing step and having for every filter parameter of the correction filtering step a gradient input and control output; every the gradient input is formed by a corresponding one of the gradient outputs and every the controller step output being fed to a corresponding one of the control inputs for generating a control signal to adjust adaptively the corresponding filter parameters of the correction filtering step and for reducing the amplitude of the error signal.

The compensation step may comprise a non-linear compensation step with non-linear transfer functions forming the non-linear components of the transfer functions of the compensation step; the non-linear compensation step may comprise a correction filtering step with non-linear transfer functions introducing the non-linear transfer function in the two input signals; the correction filtering step comprises filter parameters, inputs for controlling the filtering parameters, and a gradient output for providing a gradient signal; a sensing step comprising error outputs for providing error signals having an amplitude; the error signals correspond to the deviation of the instantaneous non-linear transfer function of the correction filtering step supplied to one of the sets of loudspeakers from the non-linear component of the desired overall transfer function; the sensing step is supplied with the feedback signal provided by the at least two microphones are located within the listening room; and a controller step having error inputs formed by the error outputs of the sensing step and having for every filter parameter of the correction filter a gradient input and control output; every the gradient input being supplied to a corresponding one of the gradient outputs and every the controller step output being supplied to a corresponding one of the control inputs for generating a control signal to adjust adaptively the corresponding filter parameters of the correction filtering step and for reducing the amplitude of the error signal.

The controller step may comprise for every filter parameter of the correction filtering step one update step having a first update input and a second update input and an update output; the update output is supplied via the controller step output to the control step input for adjusting the corresponding filter parameters of the correction filtering step. The controller step may also comprise for every filter parameter of the correction filtering step one gradient filtering step having an input and an output; the gradient inputs are supplied via the gradient filters by the first update inputs for providing filtered gradient signals to the update step and for adjusting the filter parameters; and the error inputs are supplied by the second update inputs for providing the error signals for the update step.

The controller step may alternatively also comprise an error filter having an input connected to the error input and an output connected to the second update input for providing a filtered error signal for the update unit contained in the controller; and every the gradient input may be connected to a corresponding one of the first update inputs of the update unit for adjusting the filter parameters.

The controller step may also comprise an error filtering step having an error input and an output supplied by the second update input for providing a filtered error signal for all the update steps performed in the controller step; the controller step may also comprise for every the filter parameter one gradient filter having an input and an output; and every the gradient input may be separately supplied via the gradient filter to the first update input for providing a filtered gradient signal to corresponding the update step and for adjusting the filter parameter.

The update step may comprise a multiplying step having a input supplied to the first update input, another input supplied to the second update input and a multiplying step output for providing the product of both input signals; and an integration step having an input supplied to the multiplying step output and an output supplied to the output of the update step for realizing a Least-Mean-Square update algorithm.

The audio processing method may include a controller step which also may comprises a linear adaptive filtering step having a model filter input, a model filter output and a model filter error input for adaptively modelling the loudspeaker-sensor-system, the model filter input being supplied to the electric input of the transducer; a summing step having an inverting and a non-inverting input and a summing step output for producing a second error signal, the output of the linear adaptive filtering step being supplied to one input of the summing step, the output of the loudspeaker-sensor-system being connected to the other input of the summer and the summer output being connected to the model filter error input; and a copying step copying the parameters of the linear adaptive filter to every the gradient filter contained in the controller and for adaptively compensating for the transfer function of the loudspeaker-sensor-system on-line.

The controller step may alternatively also comprise an error filter having an input connected to the error input and an output connected to the second update input for providing a filtered error signal for the update unit contained in the controller; and every the gradient input may be connected to a corresponding one of the first update inputs of the update unit for adjusting the filter parameters wherein the controller step may also comprise a linear adaptive filtering step having a model filter input, a model filter output and a model filter error input for adaptively modelling the inverse loudspeaker-sensor-system, the model filter input being supplied by the output of the loudspeaker-sensor-system; a summing step having an inverting and a non-inverting input and a summing step output for producing a second error signal, the model filter output being supplied to one input of the summing step, the electric input of the loudspeaker being supplied by the other input of the summing step and the summing step output being supplied to the model filter error input; and copying step for copying the parameters of the linear adaptive filtering step into the error filtering step and for adaptively compensating the transfer function of the loudspeaker-sensor-system online.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

DESCRIPTION OF THE DRAWING

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
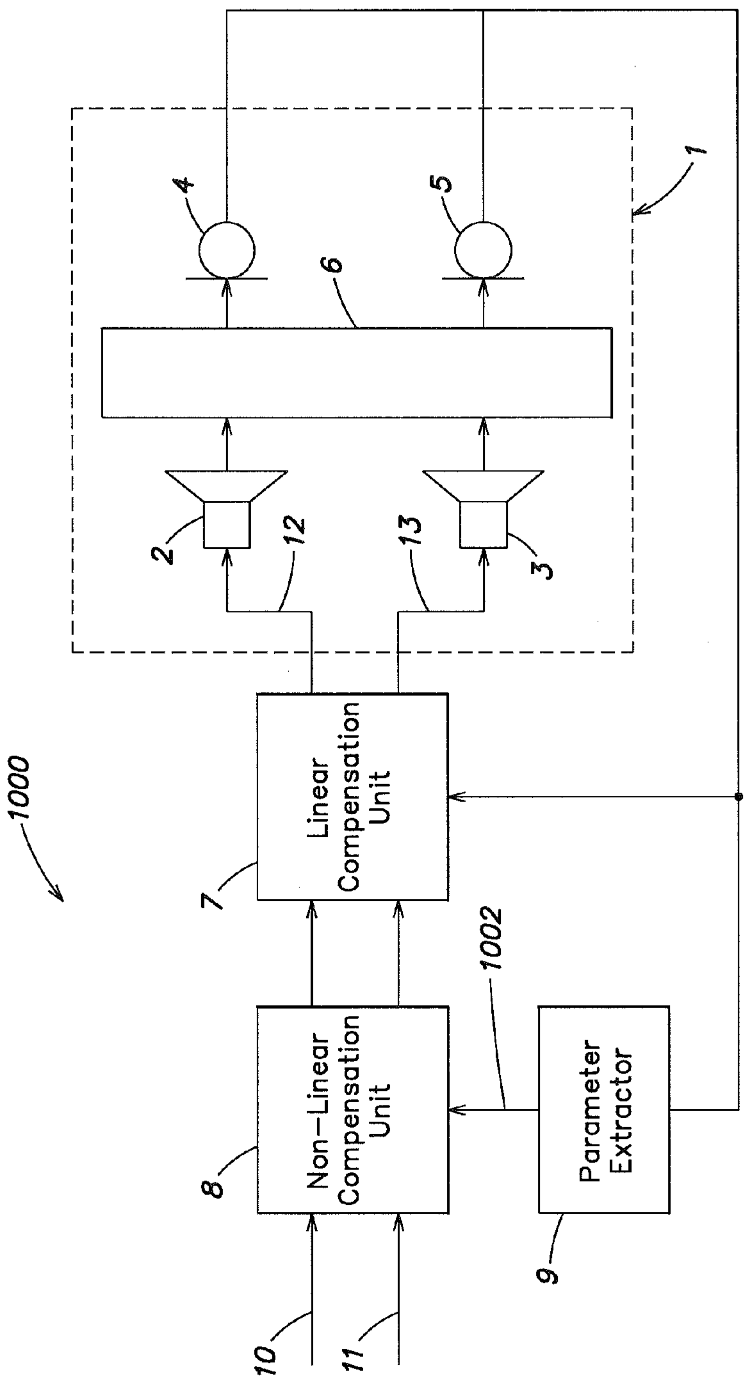
FIG. 1 is a block diagram illustration of an embodiment of a stereo audio processing system.

FIG. 1 is a block diagram illustration of an embodiment of a stereo audio processing system 1000. The stereo audio processing system 1000 is operated with a room-loudspeaker system comprising two loudspeakers 2, 3 located in a room 1. Two microphones 4, 5 are positioned within the room to receive acoustic signals from the loudspeakers 2, 3. The acoustic paths between each of the loudspeakers 2, 3 and each one of the microphones 4, 5 have respective transfer functions represented by a transfer functions matrix 6. The loudspeakers 2, 3; the microphones 4, 5; and the room 1 form a so-called loudspeaker-room-microphone system.

The loudspeakers 2, 3 are driven by the stereo processing system which comprises a linear compensation unit 7 and a non-linear compensation unit 8. Both compensation units 7, 8 are controlled by output signals of the microphones 4, 5. The non-linear compensation unit 8 is controlled via a parameter extractor 9, which generates control signals provided on a line 1002 for controlling the parameters for non-linear loudspeaker modelling performed within the non-linear compensation unit 8. Two stereo input signals 10, 11 are input into the non-linear compensation unit 8 to which the linear compensation unit 7 is connected downstream. The output signals of the microphones 4, 5 control parameters for adaptive filtering performed within the linear compensation unit 7. The linear compensation unit 7 provides output signals on lines 12, 13 to the loudspeakers 2, 3.

Amplifiers necessary for driving the loudspeakers are omitted in this and all other exemplary embodiments for the sake of simplicity. Further, the loudspeakers shown in all embodiments may also represent groups of loudspeakers each including of one or more loudspeakers connected via a distribution network.

Figure 2:
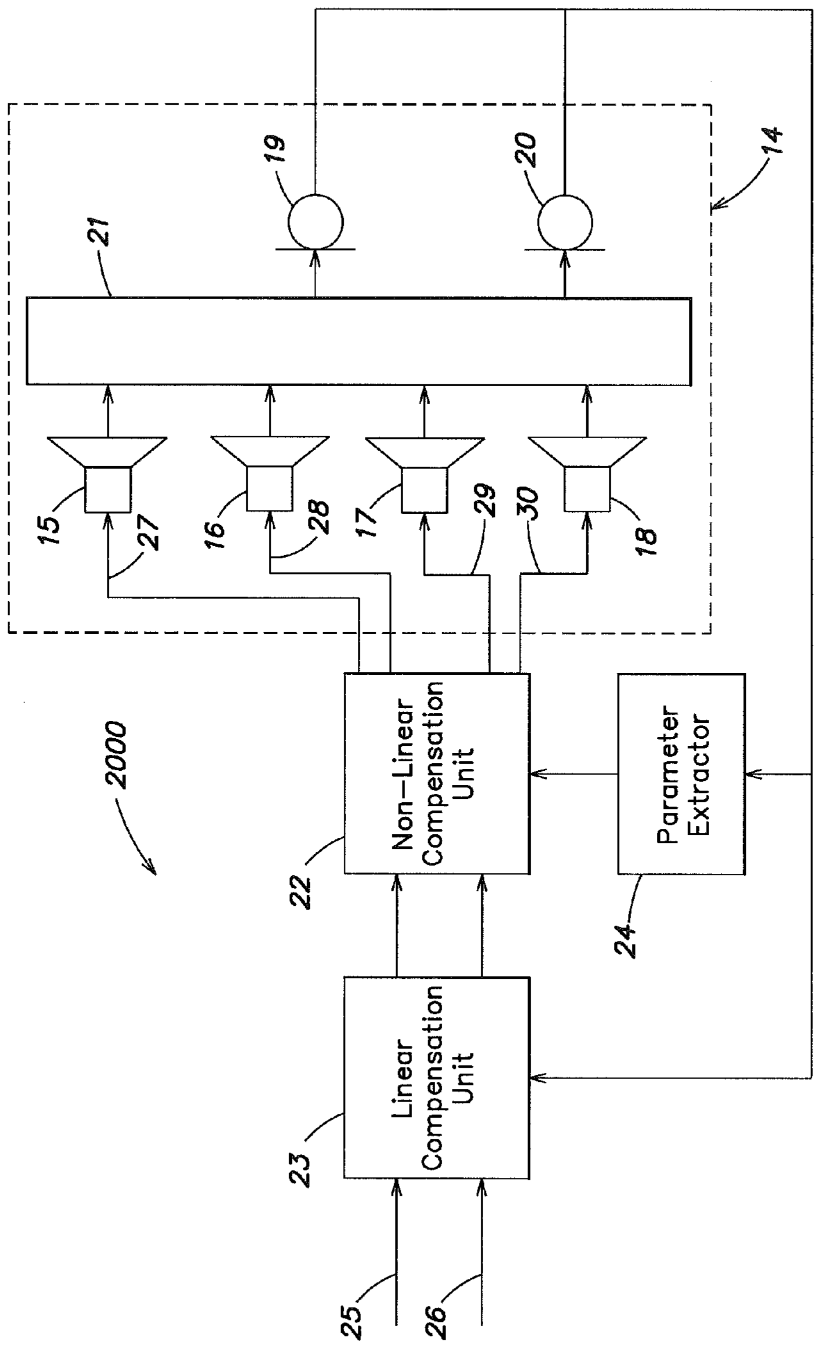
FIG. 2 is a block diagram illustration of another embodiment of a stereo audio processing system.

FIG. 2 is a block diagram illustration of another embodiment of a stereo audio processing system 2000. The stereo audio processing system 2000 is connected to a room-loudspeaker system that comprises four loudspeakers 15, 16, 17, 18 located in a room 14. Two microphones 19, 20 are arranged within the room to receive acoustic signals from the four loudspeakers 15, 16, 17, 18. The acoustic paths between each one of the loudspeakers 15, 16, 17, 18 and each one of the microphones 19, 20 have respective transfer functions represented by a transfer functions matrix 21, which is the transfer functions matrix of a so-called loudspeaker-room-microphone system formed by the loudspeakers 15, 16, 17, 18; the microphones 19, 20; and the room 14.

The loudspeakers 15, 16, 17, 18 are connected to the stereo processing system 2000, which comprises a linear compensation unit 23 and a non-linear compensation unit 22. Both compensation units 22, 23 are controlled by output signals of the microphones 19, 20. The non-linear compensation unit 22 is controlled via a parameter extractor 24 that generates control signals for controlling the parameters for non-linear loudspeaker modelling performed within the non-linear compensation unit 22. The output signals of the microphones 19, 20 also control the parameters for adaptive filtering performed within the linear compensation unit 23. Two stereo input signals 25, 26 are input to the linear compensation unit 23, which is connected upstream to the non-linear compensation unit 22. The non-linear compensation unit 22 generates four output signals 27, 28, 29, 30 supplied to the loudspeakers 15, 16, 17, 18, respectively.

Figure 3A:
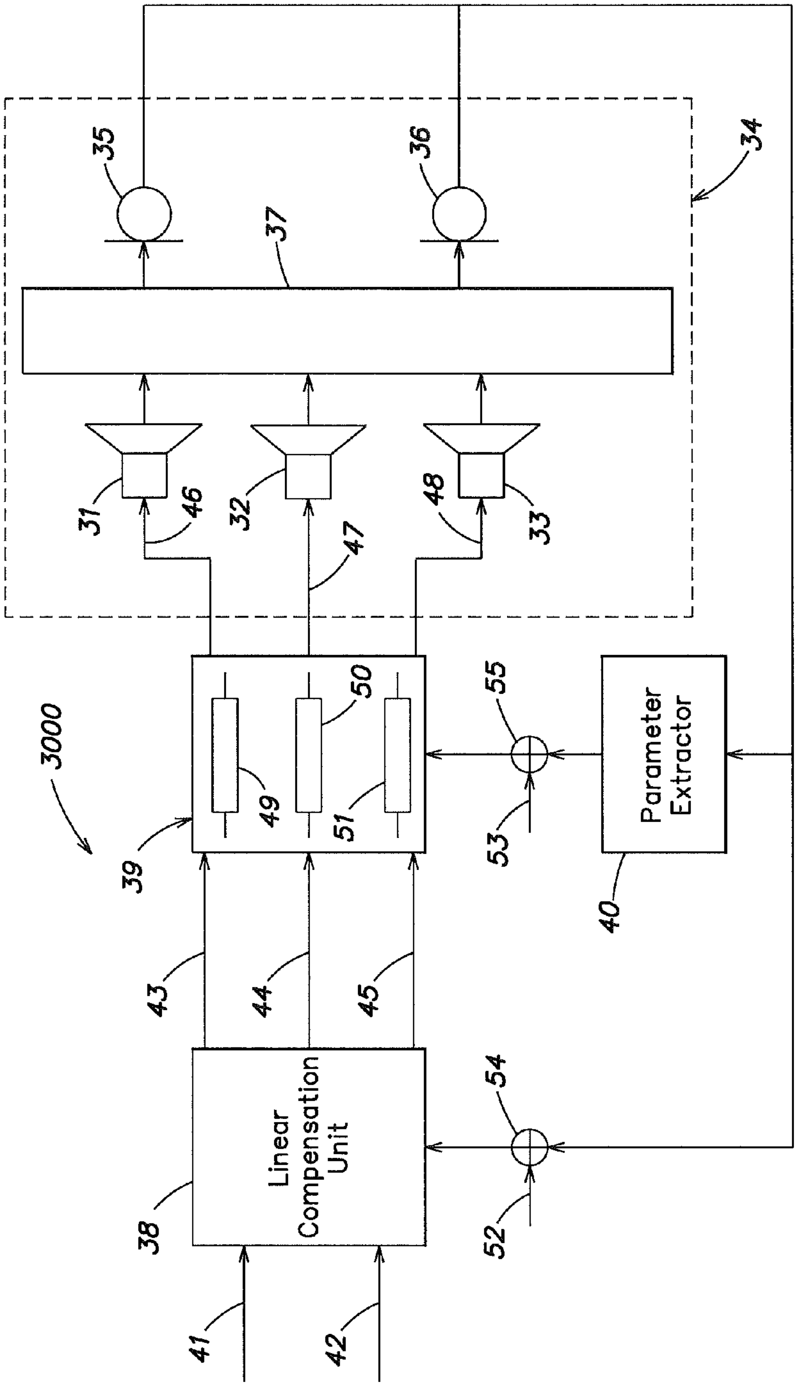
FIG. 3A is a block diagram illustration of a third embodiment of a stereo audio processing system.

FIG. 3A is a block diagram illustration of a preferred embodiment of a stereo audio processing system 3000. The stereo audio processing system 3000 operates in connection with a room-loudspeaker system. The room-loudspeaker system comprises three loudspeakers 31, 32, 33 located in a room 34. Two microphones 35, 36 are arranged within the room to receive acoustic signals from the three loudspeakers 31, 32, 33. The acoustic paths between each one of the loudspeakers 31, 32, 33 and each one of the microphones 35, 36 have respective transfer functions represented by a transfer functions matrix 37, which is the transfer functions matrix of the respective loudspeaker-room-microphone system.

The loudspeakers 31, 32, 33 are connected to the stereo processing system 3000, which comprises a linear compensation unit 38 and a non-linear compensation unit 39. Both compensation units 38, 39 are controlled by output signals of the microphones 35, 36. The non-linear compensation unit 39 is controlled via a parameter extractor 40 that generates control signals for controlling the parameters for non-linear loudspeaker modelling performed within the non-linear compensation unit 39. The output signals of the microphones 35, 36 also control the parameters for adaptive filtering performed within the linear compensation unit 38. The transfer functions of the linear compensation unit 38 and the non-linear compensation unit 39 are inverse to the linear or non-linear component of the transfer functions of the loudspeaker-room-microphone system respectively.

Two stereo input signals 41, 42 are fed to the linear compensation unit 38, which provides three output signals 43, 44, 45. The output signals 43, 44, 45 are supplied to the non-linear compensation unit 39 which supplies three driver signals 46, 47, 48 to the loudspeakers 31, 32, 33, respectively. The non-linear compensation unit 39 comprises three non-linear filters 49, 50, 51 each having a transfer function inverse to the non-linear transfer function of the respective loudspeaker 31, 32, 33.

To tune the sound functions of the loudspeaker-room system according to desired sound characteristics, two additional control signals 52, 53 are supplied to the stereo processing system. The additional control signals 52, 53 are provided to adders 54, 55, respectively, to the control signals for the linear and non-linear compensation unit 38, 39 provided by the microphones 35, 36. The additional control signals 52, 53 form bias signals for the compensation units 38, 39. The additional control signals 52, 53 control the degree of linear and non-linear compensation and, thus, determine the sound of the loudspeaker-room system by varying the additional control signals.

Preferred embodiments of linear compensation units, filters for non-linear compensation units, and a parameter extractor applicable with stereo audio processing systems are discussed below in greater detail.

Figure 3B:
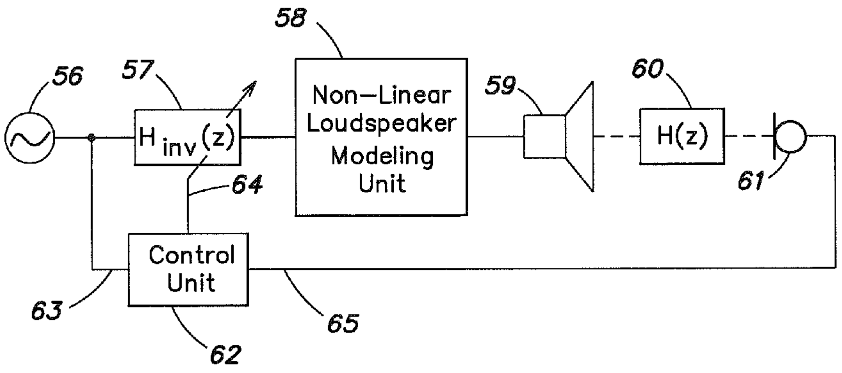
FIG. 3B is a block diagram illustration of the linear compensation unit in the embodiment of FIG. 3A for a single channel.

FIG. 3B is a block diagram illustration of a simplified linear compensation unit for use in the embodiment of FIG. 3A relating to a single channel. A signal source 5 (e.g., a radio, CD player, etc.) supplies an electrical signal 63 to a linear filter unit 57 that has a transfer function $H_{inv}(z)$. Downstream of the filter unit 57 as shown or alternatively upstream the filter unit 57 (not shown) a nonlinear loudspeaker modelling unit 58 is connected to the filter unit 57. Downstream of the filter unit 57 and the loudspeaker modelling unit 58 a loudspeaker 59 generates acoustic sound signals being transferred to a microphone 61 via a acoustic signal path 60 that can be described by a transfer function H(z). The acoustic signals received by the microphone 61 are converted into electrical signals 65 and supplied to a control unit 62 controlling the linear filter unit 57. The control unit 62 also receives the electrical signal 63 from the signal source 56. The transfer function $H_{inv}(z)$ of the filter unit 57 is the inverse function of the transfer function H(z) of the acoustic signal path 60 so that both functions compensate each other, such that the signal 65 from the microphone 61 is almost identical to signal 63 from the signal source 56.

Figure 3C:
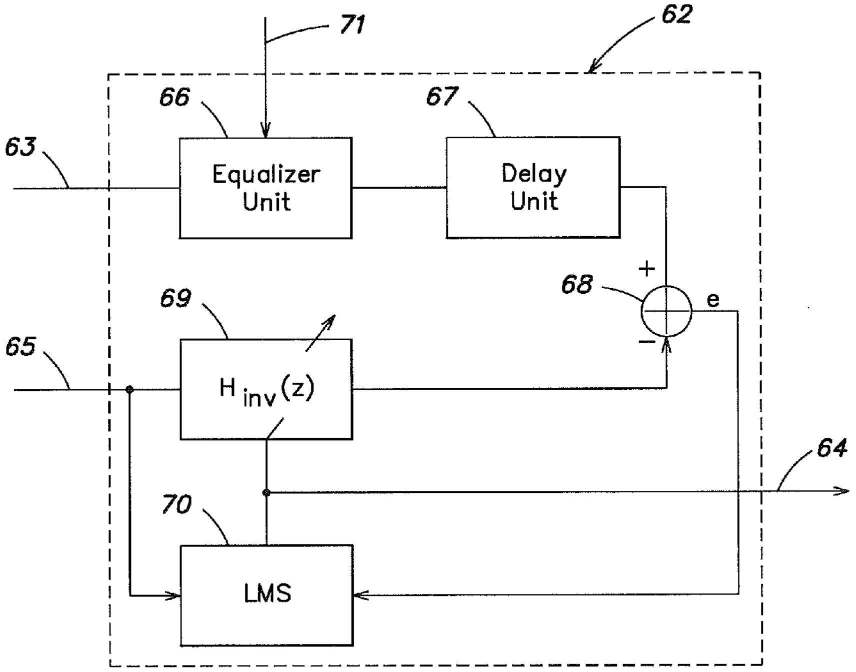
FIG. 3C is a block diagram illustration of a control unit for the linear compensation unit of FIG. 3B.

FIG. 3C is a block diagram illustration of the control unit 62 for the linear compensation unit of FIG. 3B. The signal 63 from the signal source 56 is supplied to an equalizer unit 66 for controlling the desired sound according to sound control signals 71. The listener may tune the sound via the sound control signals 71 to achieve a sound as desired. A delay unit 67 for delaying signals from the equalizer unit 66 is connected downstream to the equalizer unit 66. Signals output by the delay unit 67 and signals output by a filter unit 69 are input to a subtractor 68 which provides an error signal e. The error signal e is input to a least mean square (LMS) control unit 70 that controls the filter unit 69. The filter unit 69 and the control unit 70 receive signals 65. The signals for controlling the filter unit 69 provided by the control unit 70 are also used to control the filter unit 57 (FIG. 3B) as control signals 64. The filter unit 69 is controlled by the control unit 70 in connection with the subtractor 68, the delay unit 67, and the equalizer unit 66 to generate the inverse transfer function $H_{inv}(z)$ based on the transfer function H(z). The filter unit 57 (FIG. 3B) is controlled by the same control signals so that filter unit 57 has the same transfer function $H_{inv}(z)$ as filter unit 69.

Figure 4:
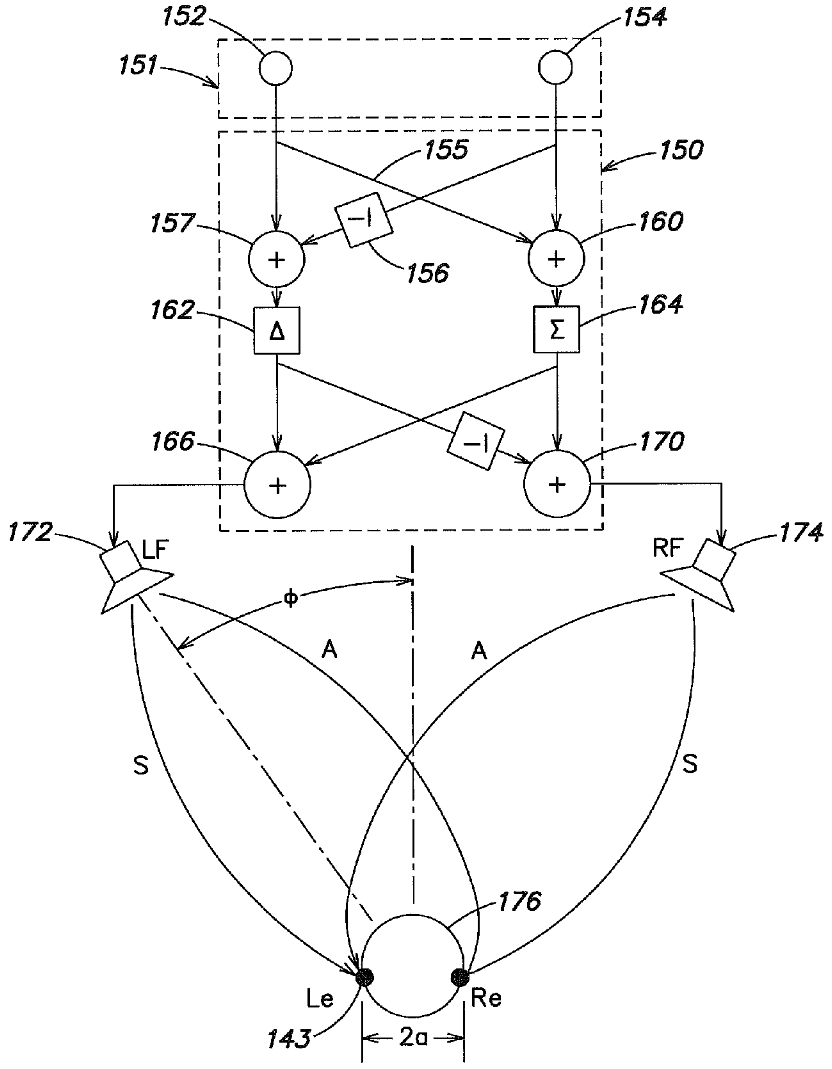
FIG. 4 is a block diagram illustration of an embodiment of a linear compensation unit for a stereo audio processing system.

FIG. 4 is a block diagram illustration of an embodiment of a linear compensation unit for use in a stereo audio processing system. The stereo audio processing system of FIG. 4 comprises an artificial head 151 comprising two microphones 152, 154 for generating two channels of audio signals having head-related transfer functions imposed thereon. A synthetic head, which is described in greater detail hereinafter with reference to FIG. 9, may alternatively be used. The audio signals from the artificial or synthetic head 151 are coupled, either directly or via a record/playback system, to a shuffler circuit 150, which provides crosstalk cancellation and naturalization of the audio signals.

The shuffler circuit 150 comprises a direct crosstalk channel 155 and an inverted crosstalk channel 156 which are coupled to a left summing circuit 157 and a right summing circuit 160, as shown. The left summing circuit 157 sums together the direct left-channel audio signal and the inverted crosstalk signal coupled thereto, and couples the resulting sum to a Delta (Δ) filter 162. The right summing circuit 160 sums the direct right-channel signal and the direct crosstalk left channel signal and couples the resulting sum to a Sigma (Σ) filter 164. The output of the Delta filter 162 is coupled directly to a left summing circuit 166 and an inverted output is coupled to a right summing circuit 170, as shown. The output of the Sigma filter 164 is coupled directly to each of the summing circuits 166 and 170, as shown. The output of the summing circuits 166 and 170 is coupled, optionally via a record/playback system to a set of loudspeakers 172 and 174 arranged with a preselected bearing angle .phi. for presentation to the listener 176.

Referring to FIG. 4, for example, where the acoustic-path transfer functions A and S are explicitly shown, it may be seen that the left ear signal at $L_e$ 143 is derived from the signal at the microphone 154 via the transfer function $S^2/(S^2-A^2)$ involving path S, to which must be added the transfer function $-A^2/(S^2-A^2)$ involving path A, with the result that the transfer function has equal numerator and denominator and is thus unity. However, a corresponding analysis shows that the transfer function from the signal at the microphone 152 to the same ear, $L_e$ 143 is $AS/(S^2-A^2)$ to which must be added $-A^2$, thus obtaining a null transfer function. This analysis illustrates crosstalk cancellation whereby each ear receives only the signal intended for it despite its being able to hear both loudspeakers.

Preferably, minimum-phase filters are used. The transfer functions S+A and S−A have a common excess phase that is nothing more than a frequency-independent delay (or advance). Since the product of these is $S^2-A^2$, all of the filters considered thus far may be synthesized as minimum-phase filters, together with appropriate increments in frequency-independent delay. This provides a distinct advantage since such augmentation is available through well-known techniques.

Crosstalk cancellation is preferably limited to frequency ranges substantially less than 10 KHz. The first reason for this is to allow a greater amount of listener head motion. The second reason is a recognition of the fact that different listeners have different head-shape and pinna (i.e., small-scale features), which manifest themselves as differences in the higher-frequency portions of their respective head-related transfer functions, and so it is desirable to realize an average response in this region.

Figure 5:
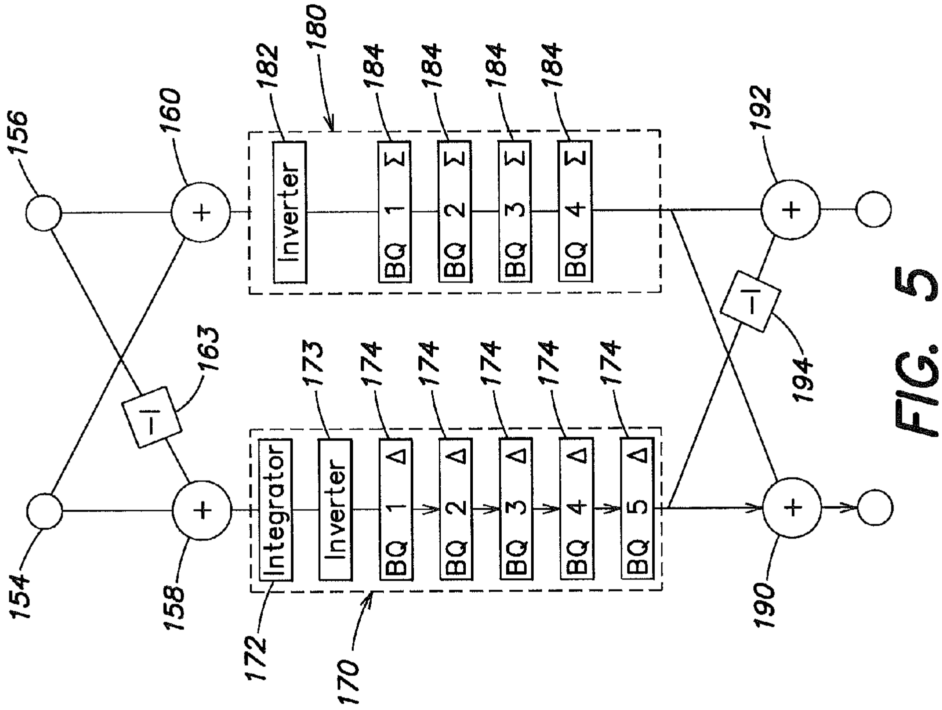
FIG. 5 is a block diagram illustration of an embodiment of a circuit illustrating sequences of biquadratic filter elements.

FIG. 5 is a block diagram illustration of an embodiment of the system of FIG. 4. In FIG. 5, input signals are coupled from inputs 154, 156 to summing circuits 158, 160 and each input is cross coupled to the opposite summing circuit with the right input 156 coupled through an inverter 163, as shown. An integrator 172 is placed in a Delta chain 170 as required at low frequencies, while inverters 173, 182 are inserted in both Sigma and Delta chains 170, 180, respectively. In these chains, a signal-inversion (polarity reversal) process happens at several places, as is common in op-amp circuits, and the inverters may be bypassed, as needed, to correct for a mismatch of numbers of inversions. The signals from the inverters 173, 182 are coupled to a series of BQ circuits (Biquadratic filter elements, also known as biquads) 174 and 184. The resulting signals are coupled to output difference-and-sum forming circuits comprising summing circuits 190, 192 and an inverter 194.

Figure 6:
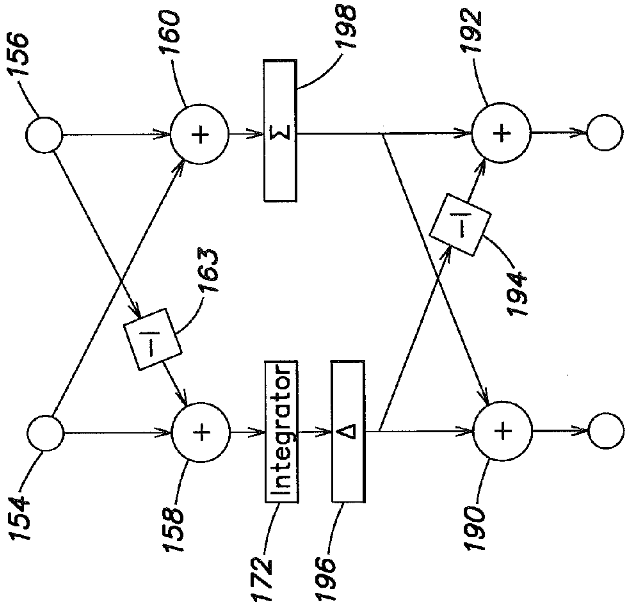
FIG. 6 is a block diagram illustration, generalized from FIG. 5 by suppressing the showing of cascade-connected biquad filter elements, illustrating an embodiment of a stereo audio processing system for crosstalk cancellation.

FIG. 6 is a generalized redrawing of FIG. 5 suppressing the showing of individual BQ (biquad) filter elements. The input circuit elements 154-163, the integrator 172, and the output elements 190-194 are the same as in FIG. 5. However, the inverter 173 and the BQ elements 174 of FIG. 5 are represented by the single element 196 of FIG. 6, and, similarly, the inverter 182 and the BQ elements 184 of FIG. 5 are represented by the single element 198 of FIG. 6. The diagram emphasizes that the invention is not restricted to specific choices of filter-synthesis elements or specific interconnection patterns. For example, it is known that the use of biquads as the filter-synthesis elements does not require the cascade pattern of interconnection, as in FIG. 5, but also allows a parallel pattern of interconnection, often favored in low-noise work, in which the outputs of the BQs are brought to a common summing element for output. Combinations of cascade and parallel patterns may also be used. The design of the individual BQs should take due account of the interconnect pattern planned. Again, approximations to the acoustic diffraction functions in sum-difference configuration may be made with minimum-phase filters. Nevertheless, the exclusion of nonminimum-phase filters is not required and the more general approach may provide an as good or better result. Further, the use of biquads does not exhaust the possibilities of all suitable filter elements, even though biquads are advantageous because of simplicity and convenience. By way of further example, it is also convenient to use IIR, or recursive, biquad filter elements in parallel connection pattern in digital designs. For all of these examples, the generalized FIG. 6 is the more representative.

As is generally known, biquads may be designed to produce a peak (alternatively a dip) at a predetermined frequency, with a predetermined number of decibels for the peak (or dip), a predetermined percentage bandwidth for the breadth of the peak (or dip), and an asymptotic level of 0 dB at extreme frequencies, both high and low.

Figure 7:
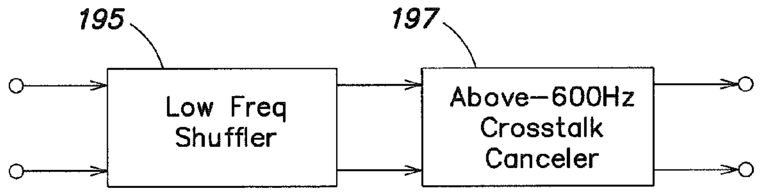
FIG. 7 is a block diagram illustration of an embodiment for the insertion of a shuffler circuit in a stereo audio processing system for crosstalk cancellation.

FIG. 7 shows a low-frequency shuffler 195 explicitly as the input section for a stereo audio signal processor in which the output section 197 is labelled as an "above-600-Hz crosstalk canceller", an even more generalized version of FIG. 5. Thus, one embodiment uses a shuffler as the low-frequency part of a crosstalk canceller and completes the canceller at higher frequencies, above some 600 Hz. Thus, a more generalized version of the low-frequency shuffler may be used, including those not explicitly of sum-difference format; for example, using through filters of the form 1+I and cross filters of the form 1−I, or using filters involving the use of feedback having the effect of inserting a zero-frequency pole in forming I, etc.

In another embodiment of a linear compensation unit, stereo audio processing systems designed in the shuffler format may be realized also in other interconnection patterns. Further, the higher frequency portion of a crosstalk canceller is a useful stereo audio signal processor, for example, in enhancing the stereo qualities of a pair of directional microphones whose directivity already provides sufficient signal difference at low frequency. Thus the use of a generalized shuffler with a generalized higher-frequency crosstalk canceller 197, in the manner of FIG. 7 provides one embodiment of a linear compensation unit wherein the quotation of a bounding frequency such as 600 Hz is to be regarded as schematic.

The linear compensation units described above provide a highly realistic and robust stereophonic sound including authentic sound source imaging, while reducing the excessive sensitivity to listener position. By limiting the compensation so that it is substantially reduced at frequencies above a selected frequency that is substantially below ten kilohertz, the sensitivity to the listener movement is reduced dramatically. For example, providing accurate compensation up to 6 kilohertz and then rolling off to effectively no compensation over the next few kilohertz can produce a highly authentic stereo reproduction, which is also maintained even if the listener turns or moves. Greater robustness can be achieved by rolling off at a lower frequency with some loss of authenticity, although the compensation must extend above approximately 600 hertz to obtain significant improvements over conventional stereo.

To obtain the binaural recordings to be processed, an accurate model of the human head fitted with carefully-made ear-canal microphones, in ears each with a realistic pinna may be used. Many of the realistic properties of the formatted stereo presentation are at least partially attributable to the use of an accurate artificial head including the perception of depth, images far to the side, even in back, the perception of image elevation and definition in imaging and the natural frequency equalization for each.

It may be also true that some subtler shortcomings in the stereo presentation may be attributable to the limitation in bandwidth for the crosstalk cancellation and to the deletion of detail in the high-frequency equalization. For example, imaging towards the sides and back seemed to depend upon cues that were more subtle in the presentation than in natural hearing, as was also the case with imaging in elevation, although a listener may hear these readily enough with practice. Many of the needed cues are known to be a consequence of directional waveform modifications above some 6 KHz, imposed by the pinna. It is significant that these cues survived the lack of any crosstalk cancellation or detailed equalization at such higher frequencies, a survival deriving from the depth of the shadowing by the head at such high frequencies so that such compensation is less sorely needed.

The experience of dedicated "binauralists" is that almost any acoustical obstacle placed between 6-inch spaced microphones is beneficial. Such obstacles have ranged from flat baffles resembling table-tennis paddles, to cardboard boxes with microphones taped to the sides, to blocks of wood with microphones recessed in bored holes, to hat-merchant's manikins with microphones suspended near the ears. One may, of course, think of spheres and ovoids fitted with microphones. Each of these has been found, or would be supposed with justice, to be workable, depending upon the aspirations of the user. The professional recordist will, however, be more able to justify the cost of a carefully-made and carefully-fitted replica head and external ears. However, any error in matching the head to a specific listener is not serious, since most listeners adapt almost instantaneously to listening through "someone else's ears." If errors are to be tolerated, it is less serious if the errors tend toward the slightly oversize head with the slightly oversize pinnas, since these provide the more pronounced localization cues.

This head-accuracy question needs to be carefully weighed in designing formatters that involve simulating the effect of a head directly, as for the synthetic head to be described hereinafter. One approach is to use measured head functions for these formatters. Fortunately, the excess delay in (S−A) and (S+A), the needed functions, is that of a uniform-with-frequency delay (or advance). The measurements, for most purposes, need to be only of the ear signal difference and of the ear-signal sum, for carefully-made replicas of a typical human head in an anechoic chamber, and for most purposes only the magnitudes of the frequency responses need to be determined. This is fortunate, since the measurement of phase is much more tedious and vulnerable to error. Such phase measurements as might be advantageous in some applications, need be only of the excess phase, i.e., that of frequency-independent delay, against an established free-field reference.

Figure 8A:
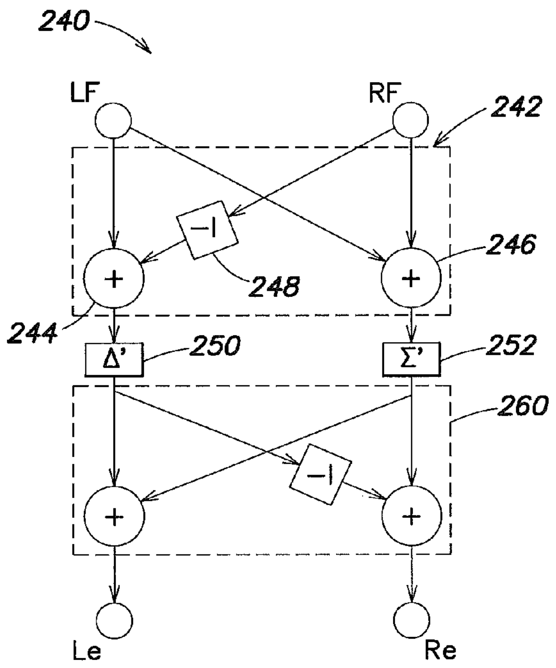
FIG. 8A is a block diagram illustration of an embodiment of a shuffler-circuit inverse formatter to produce binaural earphone signals from signals intended for loudspeaker presentation.

An example of direct head simulation would be that of a formatter to accept signals in loudspeaker format with which to fashion signals in binaural format (i.e., an inverse formatter). FIG. 8A illustrates a specific embodiment of a head-simulation inverse formatter 240 including a difference-and-sum forming network 242 comprising summing circuits 244, 246 and an inverter 248 configured as shown. The difference and sum forming circuit 242 is coupled to Delta-prime filter 250 and a Sigma-prime filter 252, the primes indicating that the filter transfer functions are to be S−A and S+A, instead of their reciprocals. The outputs of the Delta-prime and Sigma-prime filters is coupled, as shown, to a second difference and sum circuit 260, as shown.

Figure 8B:
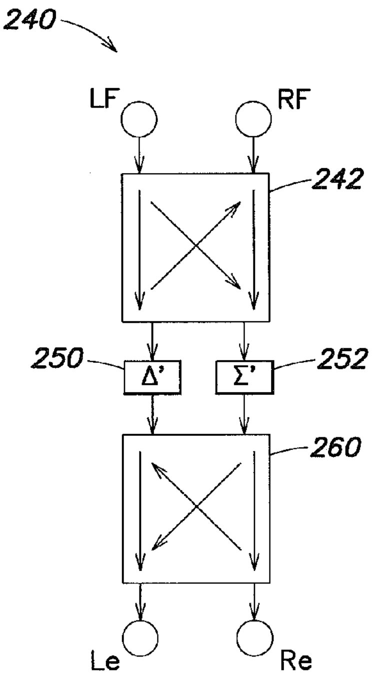
FIG. 8B is a block diagram illustration of the same embodiment illustrated in FIG. 8A, wherein the difference-sum forming networks are each represented as single blocks.

A block diagram of the inverse formatter 240 using an alternative symbol convention for the difference-and-sum-forming circuit is shown in FIG. 8B. Through the box symbol, the signal flow is exclusively from input to output. Arrows inside the box confirm this for those arrows for which there is no signal-polarity reversal, but a reversed arrow, rather than indicating reversed signal-flow direction, indicates, by convention, reversed signal polarity. Also by convention, the cross signals are summed with the direct signals at the outputs.

Figure 9:
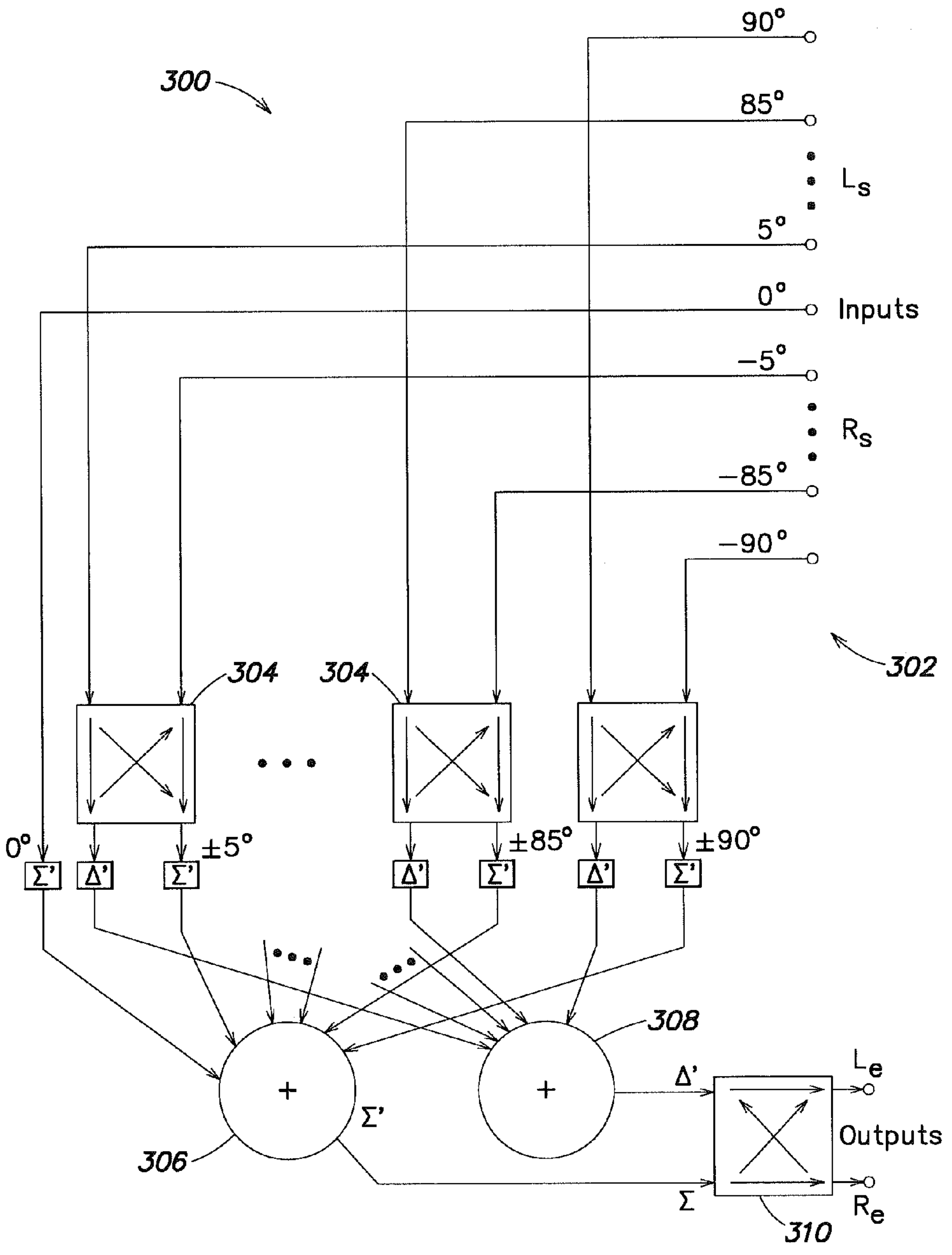
FIG. 9 is a block diagram illustration of an embodiment of a multiple shuffle-circuit formatter functioning as a synthetic head.

The above conventions are used, for compactness, in making a generalized block diagram of a specific embodiment of a synthetic head 300 illustrated in FIG. 9. A plurality of audio inputs or sources 302 (e.g., from directional microphones, a synthesizer, digital signal generator, etc.) are received, and each being designated (i.e., assigned) for a specific bearing angle, here shown as varying by 5° increments from −90° to +90°, although other arrays are possible. Symmetrically-designated input pairs are then led to difference-and-sum-forming circuits 304, each having a Delta-prime output and a Sigma-prime output, as shown. Each Sigma-prime output is coupled to a respective Sigma-prime filter and each Delta-prime output is coupled to a Delta-prime filter, as shown. The Delta-prime outputs are summed, and the Sigma-prime outputs are summed, by summing circuits 306, 308, separately and the outputs are then passed to a difference-and-sum circuit 310 to provide ear-type signals (i.e., binaural signals). The treatment of the 0°-designated input is somewhat exceptional because it is not paired, and the Sigma-prime filter for it is 2S(0°)=S(0°)+A(0°), determined for 0°, and its output is summed with that of the other Sigmas. In the diagram, ellipses are used for groups of signal-processing channels that are not be specifically shown in the interest of drawing clarity.

In the synthetic head 300, the Delta-prime and Sigma-prime filters may be determined by measurement for each of the bearing angles to be simulated, although for simple applications, the spherical-model functions will suffice. Economies are effected in the measurements by measuring only difference and sums of manikin ear signals and in magnitude only, as explained above. A refinement is achieved by the measurement of excess delay (or advance) relative to, say, the 0° measurement. This latter data is used to insert delays, not shown in FIG. 9, to avoid distortions regarding perceptions in distance for the head simulation.

Figure 10A:
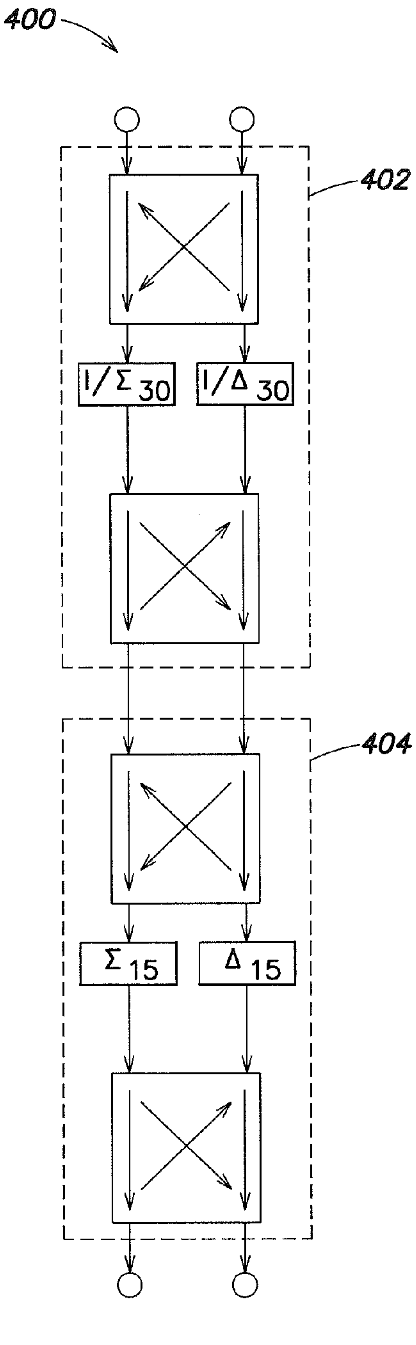
FIG. 10A is a block diagram illustration of an embodiment of a reformatter to convert signals intended for presentation at one speaker angle (e.g., ±30°) to signals suitable for presentation at another speaker angle (e.g., ±15°), employing two shuffle-circuit formatters.
Figure 10B:
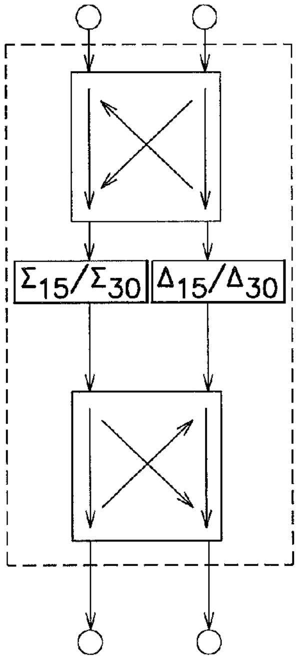
FIG. 10B is a block diagram illustration of an embodiment of a reformatter for the same purpose as in FIG. 10A, but using only one shuffle-circuit formatter.

Head simulation and head compensation used together provide a loudspeaker reformatter. A embodiment of a loudspeaker reformatter 400 is illustrated in FIG. 10A. The loudspeaker reformatter processes input signals in two steps. The first step is head simulation to convert signals intended for a specific loudspeaker bearing angle, say ±30°, to binaural signals, which is performed by an inverse formatter 402 such as that shown in FIG. 8B. The processing in the second step is to format such signals for presentation at some other loudspeaker bearing angle, say ±15° by a binaural processing circuit 404 such as that shown in FIG. 4. The two steps may, of course, be combined, as is illustrated in FIG. 10B.

Other examples of the filters used in the above processing include the following. A source $L_s$ may be represented as being at 50° via loudspeakers at ±30°, and similarly a source $R_s$ may be represented as located at −50° (i.e., on the right). Then, according to the principles stated above, sum-and-difference combinations of the transfer functions S and A can be evaluated each at 50° and 30° to be used in preparing loudspeaker signals as follows: the left loudspeaker should present a signal $$X_p=(L_s+R_s)[S(50°)+A(50°)]/[S(30°)+A(30°)] \quad (1)$$

together with a second signal $$X_n=(L_s-R_s)[S(50°)+A(50°)]/[S(30°)-A(30°)], \quad (2)$$

the combined signal simply being the sum, $X_p+X_n$, while the right loudspeaker should present the signal that is the difference, $X_p-X_n$. These filters may be minimum phase. This novel use of such simple sums and differences, and the representation of these sums and differences as minimum-phase filters provides simplification previously unknown in the art.

A narrow angular range for loudspeaker placement (narrow speaker base) also permits a wide range in listener position. The attainment of such a wide range is easily understood for mono-sum images, wherein the signals to the two loudspeakers are identical. Such an image always lies between the two loudspeakers. It lies to the left of center for a listener seated to the left, and it lies to the right of center for a listener seated to the right. The total range available to this image in response to varying listener positions, then, is reduced if the speaker base is narrowed. For other images, differences in loudspeaker-ear distances change less with varying listener positions for the more narrow speaker base. Any potential reduction in stereo-soundstage width because of the narrow speaker base is overcome through the use of a reformatter.

The restriction of the head diffraction compensation to the simulation of loudspeaker placement alone provides the advantage of enhancing compatibility with other stereo techniques. Applications include those in which a user would be offered, at the touch of a button, the option of spread imaging, vs "regular." In some cases, however, the change in imaging style may be accompanied by a noticeable change in tonal quality in the reproduced sound.

Figure 11:
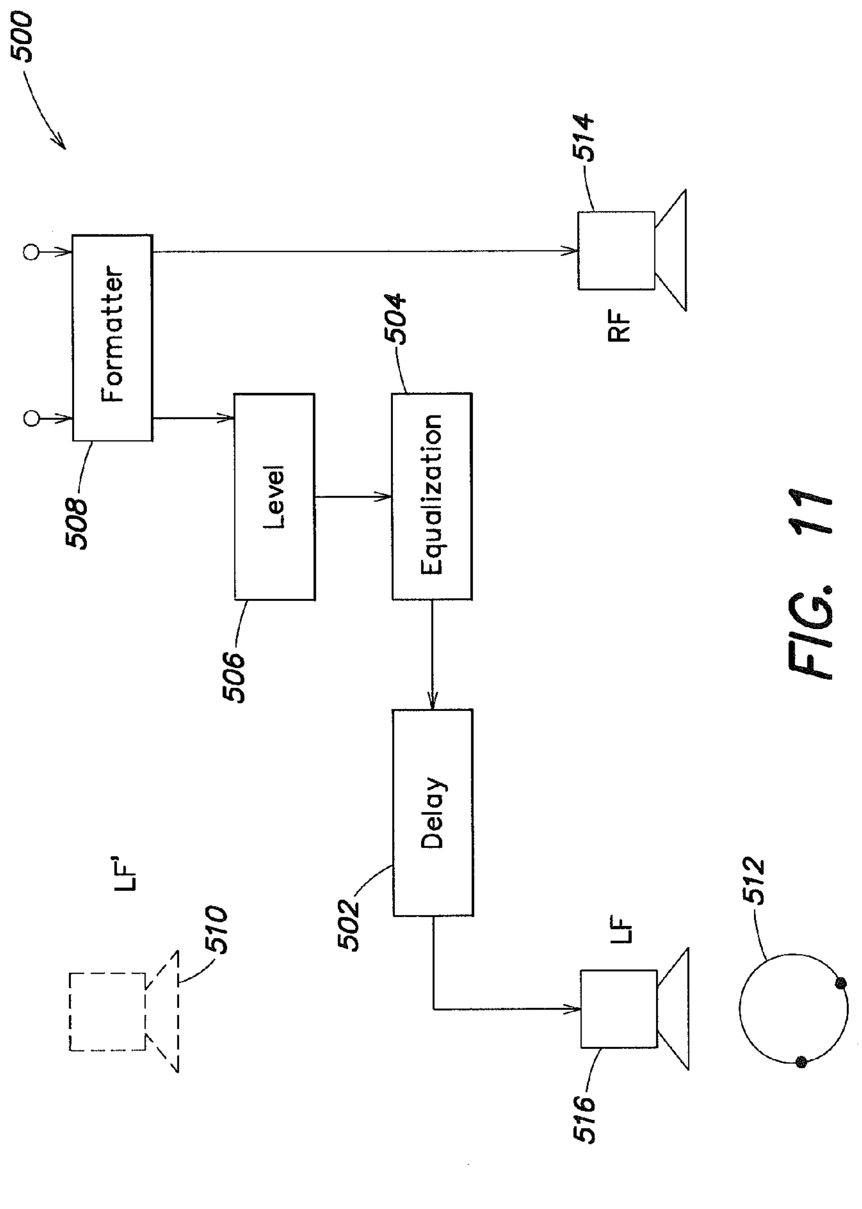
FIG. 11 is a block diagram illustration of an embodiment of a reformatter to convert signals intended for presentation via one loudspeaker layout to signals suitable for presentation via another layout, particularly one with an off-side listener closely placed with respect to one of the loudspeakers.

Loudspeaker reformatting for non-symmetrical loudspeaker placements might be found in an automobile wherein the occupants usually sit far to one side. A non-symmetrical loudspeaker reformatter 500 is illustrated in FIG. 11. Compensation for the listener 512 in unusual proximity to one loudspeaker 516 is accomplished by the insertion of delay 502, equalization 504 and level adjustment 506 for that loudspeaker. The delay and level adjustments are individually known in the prior art. However, a loudspeaker reformatter 508 provides equalization adjustment from head diffraction data for the bearing angle of the virtual loudspeaker 510, shown in dashed symbol, relative to the uncompensated, other-side loudspeaker 514. While a very good impression of the recording is ordinarily possible for such off-side listeners improved results can be obtained with such reformatting. Switching facilities may be provided to make the reformatting available either to the driver, or to the passenger, or to provide symmetrical formatting.

Figure 12:
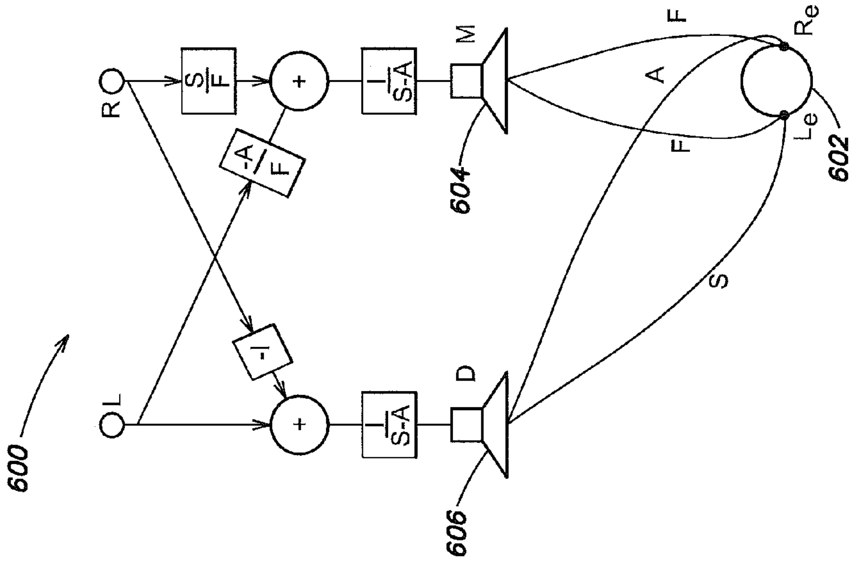
FIG. 12 is a block diagram illustrating a specific embodiment of a stereo audio processing system for an unsymmetric loudspeaker-listener layout according to the invention.

Another non-symmetrical arrangement 600, this one for the crosstalk canceller part of a reformatter, in which the loudspeakers 604, 606 may also be equidistant from the listener, and in which the asymmetry arises merely from head orientation, is illustrated in FIG. 12. The head 602 is shown directed at one of the loudspeakers 604, and the head-related transfer functions are marked S, F, and A. The designations S and A are for paths from the off-center loudspeaker to the same-side ear and to the alternate-side ear, respectively, while the designation F is for the path from the loudspeaker centrally placed at the front of the listener to either ear. The designated transfer functions are to include the effects of any difference in path length. For example, if F is to be the shorter path, then a compensating delay is to be included in any term involving 1/F, in the manner shown in FIG. 11. Also, the signals at the loudspeakers 604, 606 are designated D and M for the off-center one and for the front-center one, respectively, L and R are designations for input signals, while $L_e$ and $R_e$ are symbols for the signals at the right and left ears, respectively.

Thus, at the left ear, the signal is $L_e$=SD+FM, while at the right ear, the signal is $R_e$=AD+FM. This pair of equations may be solved to obtain the specification of loudspeaker signals as D=(L−R)/(S−A) for the off-center loudspeaker, and M=[(RS−LA)/(S−A)]/F for the front-center loudspeaker. The subscript e has been dropped in these solutions to represent the condition wherein the input signals L and R are to be made exactly equal, respectively, to the ear signals $L_e$ and $R_e$.

Figure 13:
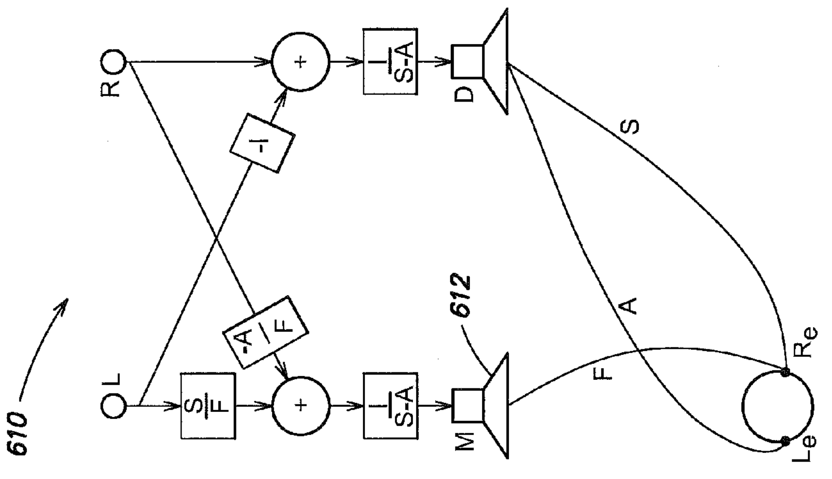
FIG. 13 is a block diagram illustration of another embodiment of a stereo audio processing system for an unsymmetric loudspeaker-listener layout.

A similar arrangement 610 is shown in FIG. 13, but with the off-center loudspeaker 612 being disposed to the right side of the array, and the specifications for the loudspeaker signals may be deduced in the same manner as set forth above. They are D=(R−L)/(S−A) and M=[(LS−A)/(S−A)]/F. It is seen that the specifications in the two systems are the same except for the interchange of the symbols L and R.

Figure 15:
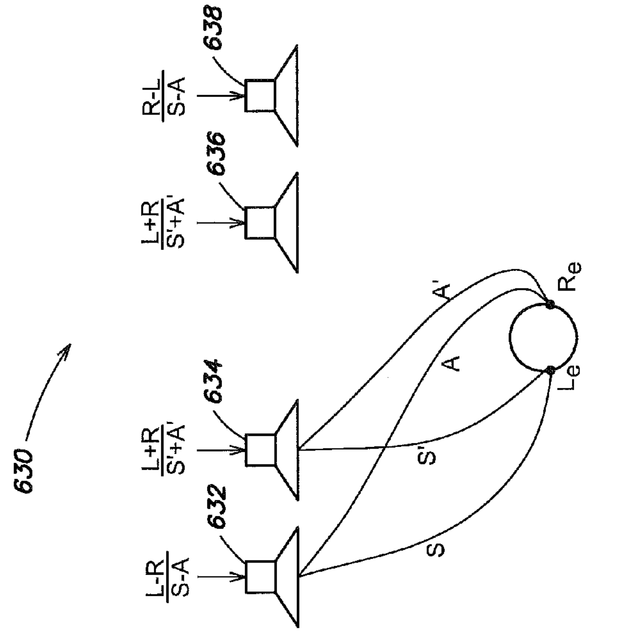
FIG. 15 illustrates signals in a specific embodiment of a stereo audio processing system for a symmetric four-loudspeaker layout.
Figure 14:
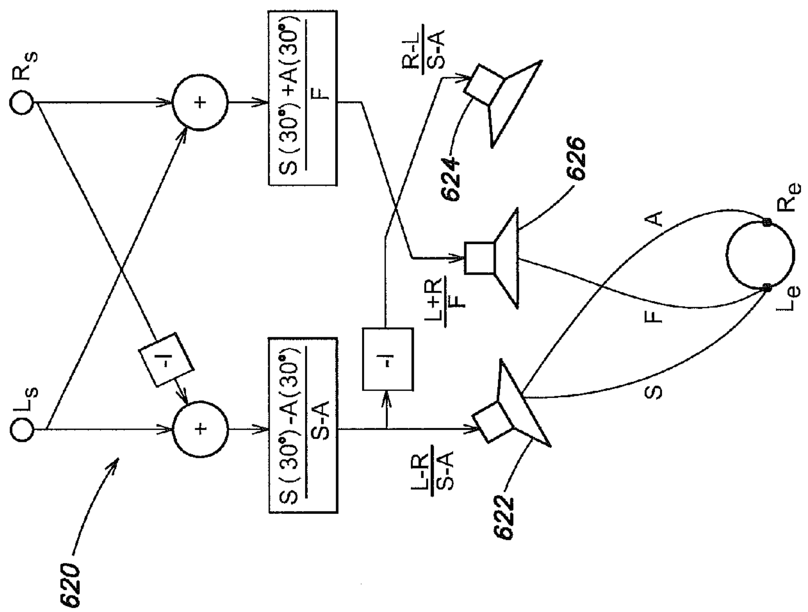
FIG. 14 is a block diagram illustration of an embodiment of a reformatter for a symmetric three-loudspeaker layout.

The two systems 600, 610 of FIGS. 12 and 13 may be taken in superposition to form the three-loudspeaker symmetric arrangement 620 shown in FIG. 14. The left off-center loudspeaker 622 signal is to obey the specification (L−R)/(S−A); the right off-center loudspeaker 624 is to obey (R−L)/(S−A); while the front-center loudspeaker 626 is to obey (L+R)/F, the sum of the two specifications above for M. It is easily seen that the sum of RS−LA with LS−RA reduces to an expression for the product of L+R multiplied by S−A. The arrangement 620 of FIG. 14 may also be seen as a specification of a four-loudspeaker system 630 as shown in FIG. 15, which may be regarded as deriving from the system of FIG. 4 by allowing the signal summing at 166 and 170 therein alternatively to take place acoustically at the ears of the listener. Thus, the four loudspeakers 632, 634, 636, 638 are supplied with the signals (L−R)/(S−A), (L+R)/(S'+A'), (L+R)/(S'+A'), and (R−L)/(S−A) respectively as illustrated in FIG. 15. The merging of the two more centrally located loudspeakers into one, and the replacement of the transfer A' and S' by the merged-path function F, complete the derivation. It is to be understood that the term loudspeaker also includes earphones and the like.

In FIG. 15, the processing system is represented by the signal combinations shown for each loudspeaker. In FIG. 14, the processor shown is a reformatter. The input signals are source signals $L_s$ and $R_s$. In this instance, these may be taken to be conventional stereo signals intended for loudspeaker presentation at ±30°, as happens to have been assumed in taking the angles appearing in the formulas L−R=($L_s$−$R_s$)[S(30°)−A(30°)] and L+R=($L_s R_s$)[S(30°)+A(30°)] as being 30°. The evaluation angles are not specified, in the interests of generality, for the denominators of the filter expressions shown in FIG. 14. These are to be chosen to match the actual angular spacing of the outer loudspeakers, of course. Those shown happen to have been drawn for 15° spacing.

There is more than one solution to the problem of finding three loudspeaker signals to combine to produce specified sums at the two ears. While there are two equations for the combining of loudspeaker signals at the ears, there are three variables, the loudspeaker signals. Such a system of equations is known as underdetermined (fewer equations than unknowns), and notorious for non-uniqueness in solution.

Figure 17:
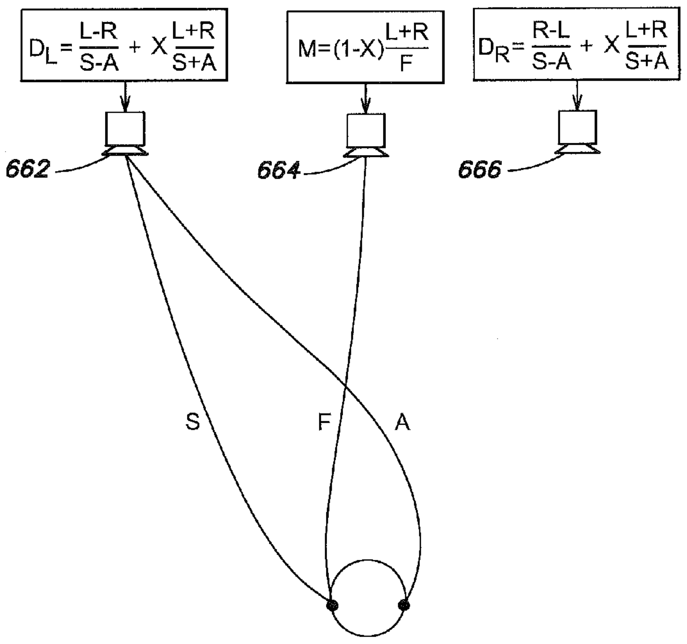
FIG. 17 illustrates signals in an embodiment of a stereo audio processing system for a symmetric three-loudspeaker layout in which a mono-sum component may be distributed in varying proportions specified by a parameter x.

For example, FIG. 14 provides a solution for the three loudspeakers 622, 624, 626 while FIG. 17 provides alternative solutions for the three loudspeakers 662, 664, 666, where a proportioning parameter, x, may take any value. Adding a proportion x of (L+R)/(S+A) to the signals of each of the side loudspeakers 662, 666 produces the same effect at the ears as before, provided that the same proportion x of (L+R)/F is subtracted from the signal at the center loudspeaker 664. Thus x=0 provides the three-loudspeaker case of FIG. 14, while x=1 provides the previous two-loudspeaker case, and many other cases may be constructed.

Selecting a specific solution is the Moore-Penrose pseudo-inverse. Starting from the ear-signal equations $$L=SD_L+FM+AD_R \quad (3)$$

$$R=AD_L+FM+SD_R \quad (4)$$

the shuffler versions may be written in matrix form, $$\begin{bmatrix}\Sigma\\ \Delta\end{bmatrix}=\begin{bmatrix}P & 0 & F\\ 0 & N & 0\end{bmatrix}\begin{bmatrix}D_\Sigma\\ D_\Delta\\ 2M\end{bmatrix} \quad (5)$$

wherein P=S+A, N=S−A, Σ=L+R, Δ=L−R, $D_{\Sigma-}$=$D_L$+$D_R$, and $D_{\Delta-}$=$D_L$−$D_R$. Then the matrix product wherein the 3×2 matrix multiplies its own 2×3 transpose, $$\begin{bmatrix}P & 0 & F\\ 0 & N & 0\end{bmatrix}\begin{bmatrix}P & 0\\ 0 & N\\ F & 0\end{bmatrix}=\begin{bmatrix}P^2+F^2 & 0\\ 0 & N^2\end{bmatrix} \quad (6)$$

is formed as shown, and its inverse is calculated. This inverse is 2×2 and looks like the 2×2 matrix above except that $p^2$+$F^2$ is replaced by its reciprocal and $N^2$ is replaced by its reciprocal. The pseudoinverse, then, may be defined to be the matrix product $$\begin{bmatrix}P & 0\\ 0 & N\\ F & 0\end{bmatrix}\begin{bmatrix}1/(P^2+F^2) & 0\\ 0 & 1/N^2\end{bmatrix}=\begin{bmatrix}x/P & 0\\ 0 & 1/N\\ (1-x)/F & 0\end{bmatrix} \quad (7)$$

where x=$P^2$/($P^2$+$F^2$), so that 1−x=$F^2$/($P^2$+$F^2$). Conversion from shuffler form back to individual loudspeaker signals produces the same loudspeaker signal formulas (except standing for 2$D_L$, 2M, 2$D_R$, a factor-2 adjustment that we omit) as shown in FIG. 17, with x specified above, as a kind of frequency-dependent gain.

Study of the pseudoinverse solutions shows that |P| and |F| may substitute for P and F, respectively, in the expressions for x and 1−x, in which case it might be better to write these as $|X|^2=|P|^2/(|P|^2+|F|^2)$ and $1-|X|^2=|F|^2/(|P|^2=|F|^2)$, falling in the range from 0 to 1. For realization as a system function, it would be preferable to accept minimum-phase versions having these same magnitude functions. Then, the notations $X^2$ and 1−$X^2$ would be more suitable. It appears to be a function of these solutions that they avoid ill conditioning, making 1−x be small when F is small and making x be small when P is small.

Figure 18A:
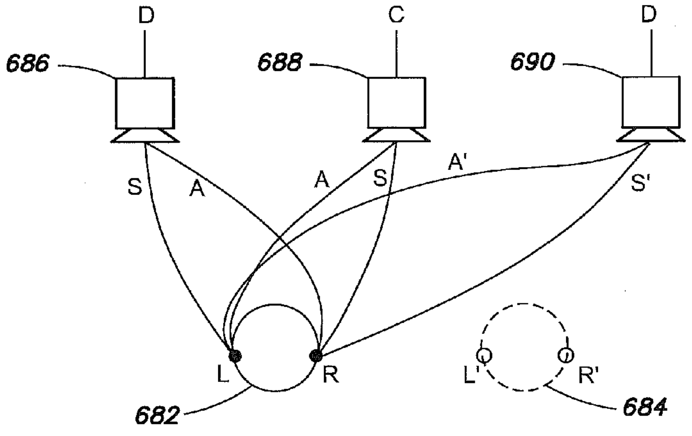
FIG. 18A illustrates signal paths for an embodiment of a stereo audio processing system in a symmetric three-loudspeaker layout in which a provision is to be made for a second listener.

Another arrangement, this time for two listeners 682, 684, but using three loudspeakers 686, 688, 690 is shown in FIG. 18. The first listener 682 is shown in solid-line symbol, with the second listener 684 shown in dotted line. The analysis is done for only one head present in the acoustic field, relying upon the approximation in which the presence of one head hardly affects what is heard by another. The design is for the second head 684 to hear reverse stereo, namely L'=R and R'=L. Thus, the two outer loudspeakers 686, 690 (D) carry the same signal. While it may be that the farther D loudspeaker will have only a minor influence because of the precedence effect, the analysis takes that influence into account. The analysis omits reflected paths, assuming anechoic space, although one application might be stereo reproduction in an automobile, where such reflections may be important.

The matrix equations are $$\begin{bmatrix}L\\ R\end{bmatrix}=\begin{bmatrix}S+A' & A\\ A+S' & S\end{bmatrix}\begin{bmatrix}D\\ C\end{bmatrix} \quad (8)$$

and the determinant of the 2×2 matrix is $$|\det| = S^2 - A^2 + SA' - AS' \quad (9)$$
$$= (S-A)(S+A)[1 + (SA' - AS')/(S^2 - A^2)],$$

showing extraction of the (S−A)(S+A) factors, or $$|\det|=(S-A)(S+A)(1+E), \quad (10)$$

where $$E=(SA'-A')/(S^2-A^2), \quad (11)$$

contains the longer-path terms. Solution for D and C yields $$D=(SL-AR)/|\det| \quad (12)$$

and $$C=[(S+A')R-(A+S')L]/|\det|. \quad (13)$$

These expressions are developed further, below, to cast them in forms exhibiting numerator terms involving L+R and L−R.

In D, the numerator may be written as 1/2S(L+)−1/2A(+R)+1/2S(L−)+1/2A(−R), where the blank spaces are to receive insertions from adding and subtracting 1/2(SR+AL), thus obtaining $$D=1/2(L+R)/D_1+1/2(L-R)/D_2, \quad (14)$$

after cancelling common factors S+A or S−A between numerator and denominator, while in C, the numerator may be written as 1/2(S+A')(+R)1/2(A+S')(L+)−1/2(S+A')(−R)−1/2(A+S')(L−), where the blank spaces are for insertions by adding and subtracting 1/2[(A+S')R+(S+A')L], thus obtaining $$C=1/2(L+R)Q_1/D_1-1/2(L-R)Q_2/D_2, \quad (15)$$

also after cancelling factors in common between numerator and denominator, in which $$D_1=(S+A)(1+E), D_2=(S-A)(1+E), \quad (16)$$

and $$Q_1=1-(S'-A')/(S-A), Q_2=1+(S'+A')/(S+A), \quad (17)$$

show compensation for the influence of the longer paths, S' and A'. Also, G may be defined to be $(SS'-AA')/(S^2-A^2)$ to write the numerator factors of C as $$Q_1=1-G+E, Q_2=1+G+E, \quad (18)$$

completing the expression of the longer-path terms as implicit dependence via the symbols G and E.

Because of the longer path, the precedence effect in human hearing would tend to make the omission of such terms of less consequence than might be ordinarily supposed. The above form of expression, by way of emphasis, points to terms that, making relatively minor contributions, might prove nearly negligible.

Four-loudspeaker (and larger number) extensions of these three-loudspeaker cases are apparent. For example, the two-listener application may be satisfied without stereo-field reversal by using four loudspeakers. Also, the pseudoinverse treatment may be extended to four loudspeakers.

Figure 16B:
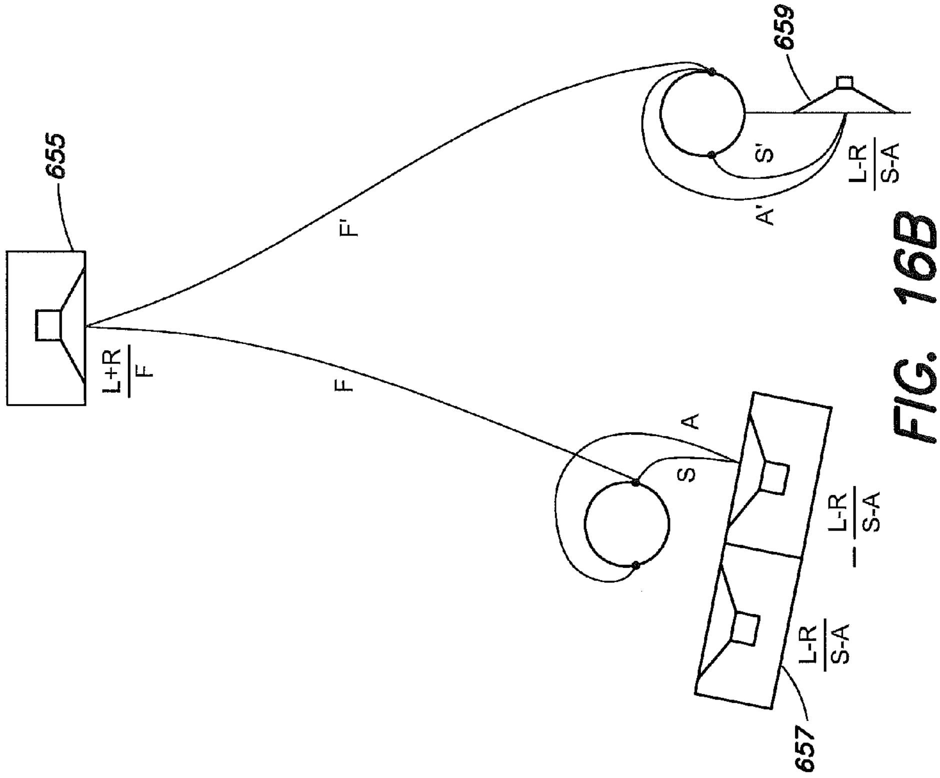
FIG. 16B illustrates signals in an embodiment of a stereo audio processing system for a symmetric dipole-monopole loudspeaker layout in which a mono-sum component is projected from in front of a listener at an appreciable distance with a stereo-difference component being projected by a dipole transducer close to the listeners ears in an arrangement that may be replicated for many listeners.
Figure 16A:
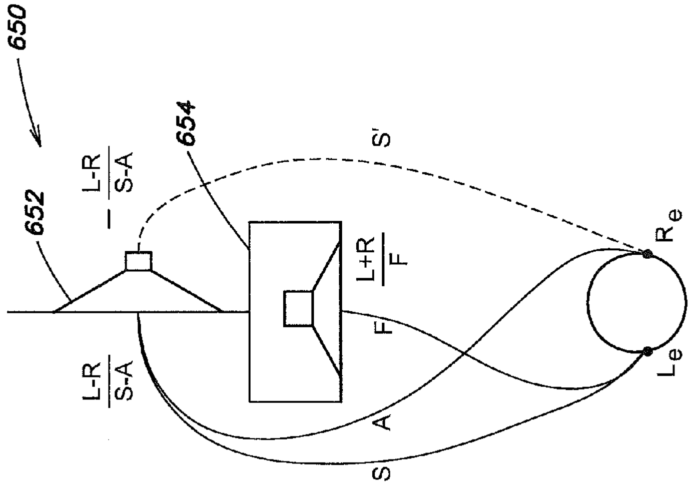
FIG. 16A illustrates signals in an embodiment of a stereo audio processing system for a symmetric dipole-monopole loudspeaker layout.

Another loudspeaker arrangement 650 is shown in FIG. 16A, with the processing system being represented by the signal combinations shown therein as loudspeaker signals. At the top, a single-diaphragm-loudspeaker symbol in open baffle represents a dipole radiator 652, while a similar symbol in closed baffle represents a monopole radiator 654. The front-side and back-side radiations from a dipole are of opposite polarity, as indicated. Also as indicated, the paths A and taken by the front-side radiation, while the back-side paths would be the equivalent paths A' and S' (of which S' alone is shown in dashed line).

Another embodiment of a linear compensation unit is shown in FIG. 16B in which a M−S loudspeaker arrangement includes a monopole radiator 655 and dipole radiators 657, 659 with the processing system being represented by the signal combinations shown therein as loudspeaker signals. The arrangement can be advantageously configured for a large number of listeners by placing the monopole loudspeaker 655 at a substantial distance in front of the listeners, and placing a dipole arrangement 657 or 659 close to (in front, at sides, behind each listener where it needs to radiate relatively little power so as to not disturb neighboring listeners (already protected by the precedence effect). The diffraction compensation includes, for the long path F or F' in comparison to the shorter paths from the dipole arrangements, insertion of delay in the electrical signals supplied to the dipoles.

In considering these shorter paths, it will be understood that the showing of them in the drawings is highly schematic, the actual signal propagation being, of course, a wave-diffraction phenomenon in which a definite path may not be meaningfully designated (except in the sense of a phasor-weighted sum over all possible paths). However, the diffraction propagation is measurable and the processing coefficients fully determinable in the art, so that the schematic showing represents full determination for one of ordinary skill in the art.

A variety of dipole arrangements are to be understood as falling within the teachings of the invention, not merely the use of two closely-spaced opposite-polarity loudspeakers, or a single-diaphragm loudspeaker. These include, but are not limited to various mechanical supporting structures with projecting mounting pods, concealment in head rests and the like, and opposite-polarity earphones, worn on the head, of the open-air variety freely permitting audition of outside sounds.

It will be understood that the transducers in the dipole loudspeakers may be quite small, since good performance at frequencies below some 200 Hz will often not be required, there being rather little usable stereo-difference signals available, in many cases, at such frequencies. Applications in cinema theatres and automobiles are particularly advantageous. In some instances, such arrangements offer sufficient flexibility in loudspeaker placement to permit avoidance of certain undesirable effects from such phenomenon as early reflections.

It should also be understood that the three loudspeaker arrangement 620 shown in FIG. 14 is extraordinary in its signal pattern: firstly, in that the signals are filtered in accordance with diffraction-path transfer functions, and secondly, in that the outer pair of loudspeakers carry filtered antiphase stereo-difference signals while the center carries a differently-filtered mono-sum signal. Even if the filtering functions be set aside, the prior art does not teach such three-loudspeaker arrangements. In the prior art, the outer loudspeakers carry L and R, not their differences.

Figure 18B:
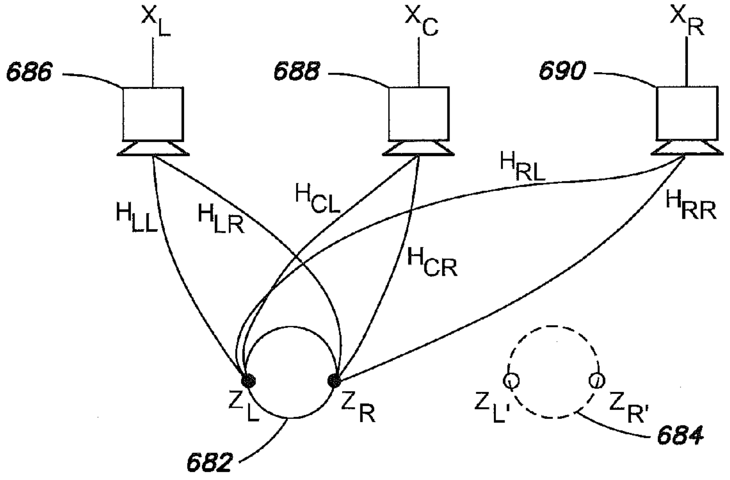
FIG. 18B illustrates signal paths for another embodiment of a stereo audio processing system in a virtual three-loudspeaker layout with inverse filtering.
Figure 18C:
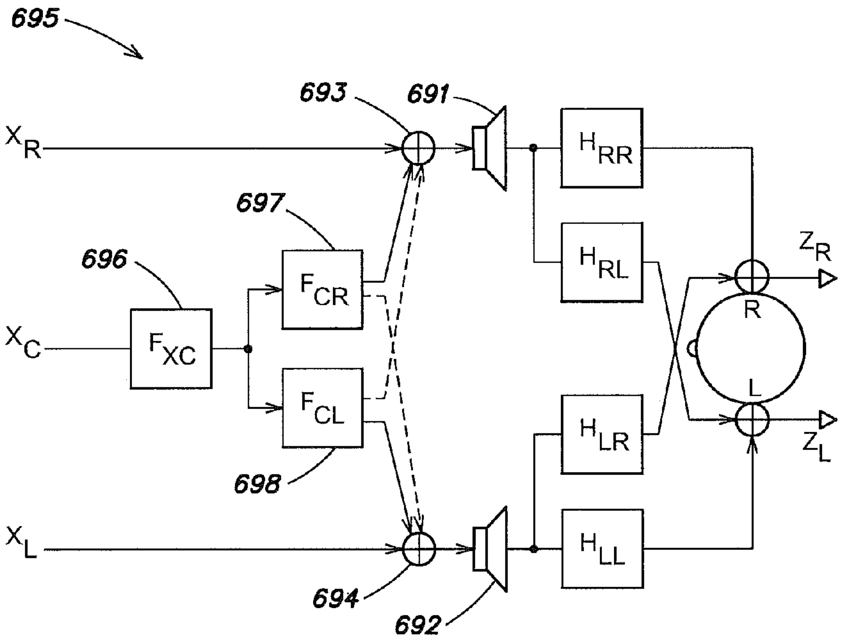
FIG. 18C is a block diagram illustration of inverse filtering in connection with two real loudspeakers for the virtual three-loudspeaker embodiment of FIG. 18B.

FIG. 18C illustrates another arrangement for the two listeners 682, 684 using two real loudspeakers 691, 692 and inverse filtering in order to create three virtual loudspeakers 686, 688, 690 as shown in FIG. 18B.

In FIG. 18B the first listener 682 is shown in solid-line symbol, with the second listener 684 shown in dotted line. The analysis is done for only one head present in the acoustic field, relying upon the approximation in which the presence of one head hardly affects what is heard by another. The design is for the second head 684 accordingly. Thus, the two loudspeakers 691, 692 carry the original stereo signal. The analysis omits reflected paths, assuming anechoic space, although one application might be stereo reproduction in an automobile, where such reflections may be important. In particular, loudspeaker 686 carries an acoustic signal $X_L$ (left channel), loudspeaker 688 an acoustic signal $X_C$ (center channel), and loudspeaker 690 an acoustic signal $X_R$ (right channel). The listener receives signals $Z_L$ (left channel) and $Z_R$ (right channel) via transfer paths having the transfer functions $H_{LL}$, $H_{LR}$, $H_{CL}$, $H_{CR}$, $H_{RL}$, and $H_{RR}$ from the loudspeakers 686, 688, 690.

The matrix equations for this virtual system are $$\begin{vmatrix} Z_L \\ \\ Z_R \end{vmatrix} = \begin{vmatrix} H_{LL} H_{CL} H_{RL} \\ \\ H_{LR} H_{CR} H_{RR} \end{vmatrix} \cdot \begin{vmatrix} X_L \\ X_C \\ X_R \end{vmatrix}$$

In order to achieve the acoustic situation of FIG. 18B by only two real loudspeakers, namely loudspeakers 691, 692, a structure as illustrated in FIG. 18C is used.

The signals for the loudspeakers 691, 692 are provided by two adders 693, 694 which receive the signals $X_R$ and $X_L$ respectively. Further, both adders 693, 694 that the signal $X_C$ filtered by a filter unit 695. The filter unit 695 comprises a filter section 696 having a transfer function $F_{XC}$ and being supplied with signal $X_C$. A filter section 697 having a transfer function $F_{CR}$ is connected between filter section 696 and adder 693. A filter section 698 having a transfer function $F_{Cl}$ is connected between filter section 696 and adder 694. The respective transfer functions are:

$$F_{XC}=1/(H_{LL}\cdot H_{RR}-H_{LR}\cdot H_{RL})$$

$$F_{CR}=(H_{LL}\cdot H_{CR}-H_{LR}\cdot H_{CL})$$

$$F_{CL}=(H_{RR}\cdot H_{CL}-H_{RL}-H_{CR})$$

The embodiment discussed above is related to listener 682. For listener 684 filter section 697 would be connected to adder 694 and, accordingly, filter section 698 would be connected to adder 693 as indicated by doted lines in FIG. 18C.

The embodiments of FIGS. 4-18A are described in more detail in U.S. Pat. No. 5,333,200 which is incorporated herein by reference.

Figure 19:
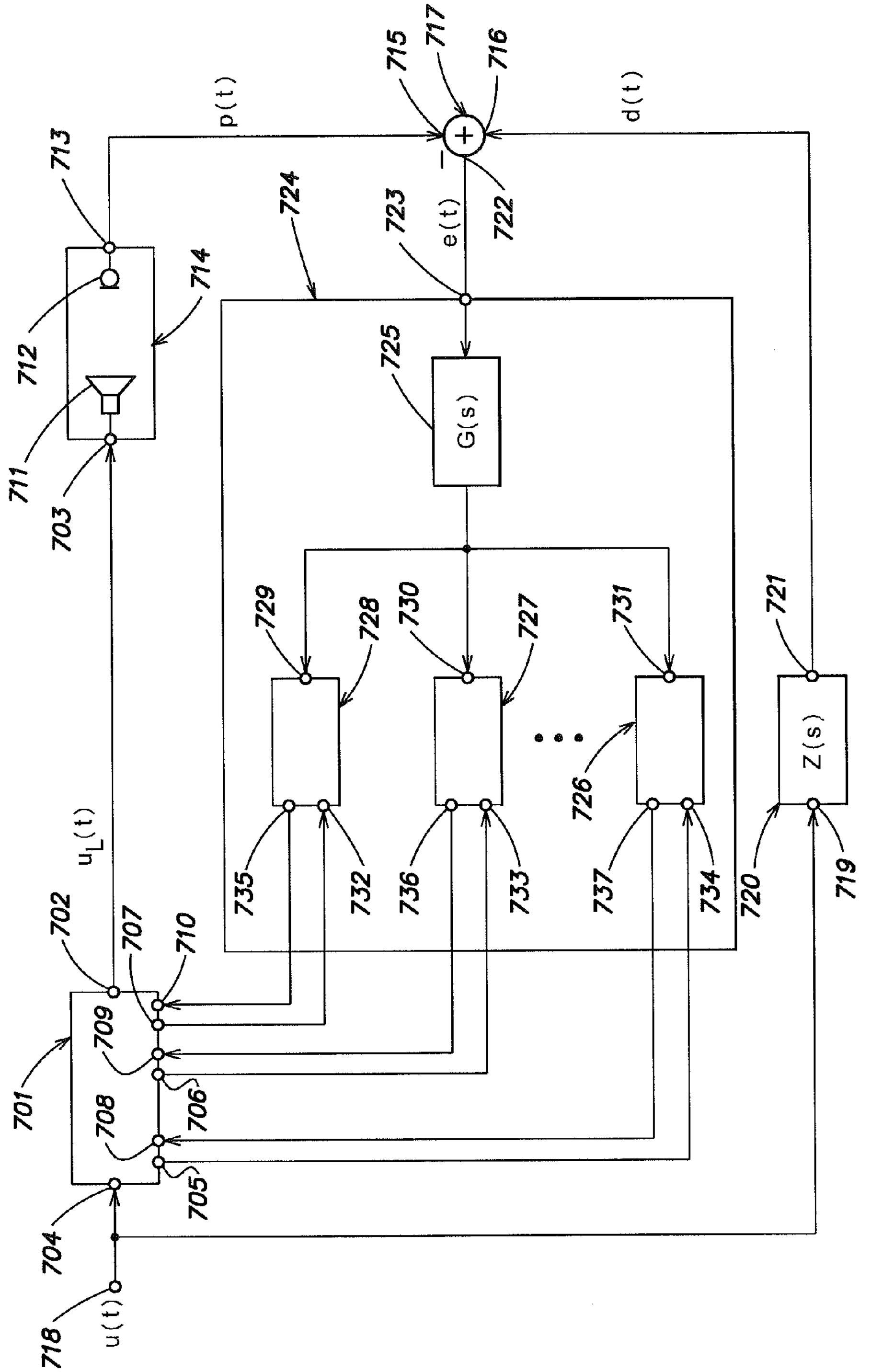
FIG. 19 is a block diagram illustration of an embodiment of a non-linear filter for a non-linear compensation unit for a stereo audio processing system.

FIG. 19 shows a general block diagram of a non-linear filter for a non-linear compensation unit according to the present invention. A correction filter 701 is connected via its output 702 to the electric input 703 of a transducer 711. The sensor 712, the summer 717 and the linear reference filter 720 form a sensing circuit. The general input 718, supplying a signal u(t) (e.g., an audio signal), is connected with the input 719 of the reference filter 720 that shows the desired transfer function of the overall system. The output 721, which supplies a desired signal d(t), is connected with the non-inverting input 716 of the summer 717. The sensor 712 may be a separate sensor or formed by microphones also used for the linear compensation. The output 713 of the sensor 712, which senses an acoustic or a mechanic or an electric signal p(t) of the transducer 711, is connected with the inverting input 715 of the summer 722. The error signal e(t) at the output 722 with $$e(t)=d(t)-p(t) \tag{19}$$

is supplied to the input 723 of the controller 724. The controller comprises a circuit 725 and for every filter parameter $P_i$ (i=1, 2, . . . , N) a corresponding sub-controller represented in FIG. 1 for N=3 by sub-controllers 726, 727, 728. The error signal e(t) is supplied via the circuit 725 to the inputs 731, 730, 729 of the sub-controllers 726, 727, 728. Every sub-controller 726, 727 or 728 has an output 737, 736, 735, which is connected to the corresponding input 708, 709, 710 of the correction filter 701 to adjust the filter parameters $P_i$ (i=1, 2, . . . , N), respectively. The correction filter 701 has additional outputs 705, 706, 707 to supply the gradient signals $b_i(t)$ (i=1, 2, . . . , N) to the corresponding inputs 734, 733, 732 of the sub-controllers 726, 727, 728.

Figure 20:
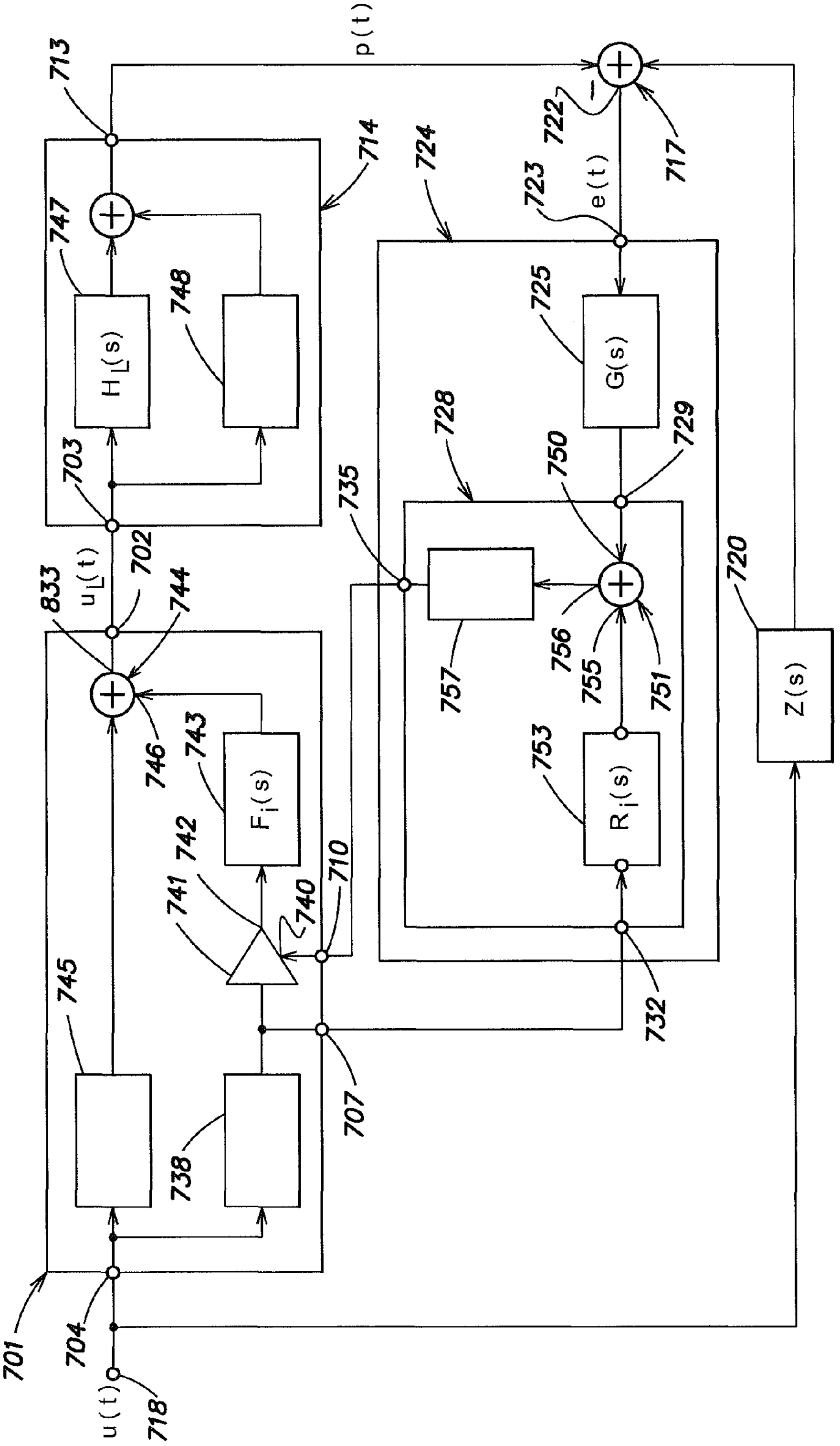
FIG. 20 is a block diagram illustration of a sub-controller for the adaptive adjustment of one filter parameter in the non-linear filter for a non-linear compensation unit according to FIG. 19.

FIG. 20 illustrates the basic structure of the correction filter 701, a model of the transducer-sensor-system 714 and the elements of one sub-controller 728 in more details. The correction filter 701 comprises for every filter parameter $P_i$ (i=1, 2, . . . , N) a linear or non-linear sub-circuit and a multiplier or an amplifier with controllable gain.

For simplicity reasons, FIG. 20 illustrates only a sub-circuit 738 and an amplifier 741 corresponding to one filter parameter $P_j$. The filter sections with the remaining filter parameters $P_i$ (i=1, 2, . . . , N; i.noteq.j) are contained in the circuit 745 and have the same structure as the depicted circuit for parameter $P_j$. The filter input 704 is connected to the input of the sub-circuit 738. The output of the sub-circuit 738 is supplied via the amplifier 741 directly or via an additional linear or non-linear circuit 743 to the input 746 of an adder 744. Assuming that the circuit 743 is linear or only weak non-linear, the circuit 743 can be approximately described by the linear transfer function $F_j(s)$. Using this assumption the correction filter can be modelled by a linear combiner and the signal $u_L(t)$ at output 702 is the sum $$u_L(t) = \sum_{i=1}^{N} P_i b_i(t) * f_i(t) \tag{20}$$

where $b_j(t)$ is the signal at the output of the sub-circuit 738, $f_j(t)=L_{-1}\{F_j(s)\}$ is the impulse response of the circuit 743 which corresponds via the inverse Laplace-transform $L_{-1}$ with the system function $F_j(s)$ and the notation * represents the convolution operator.

The polynomial filter fulfils this model with $f_i(t)=\Delta(t)$ (i=1, . . . , N) completely. The used delta-function is defined by $\Delta(t)=1$ for t=0 and $\Delta(t)=0$ for $t\neq 0$.

Figure 21:
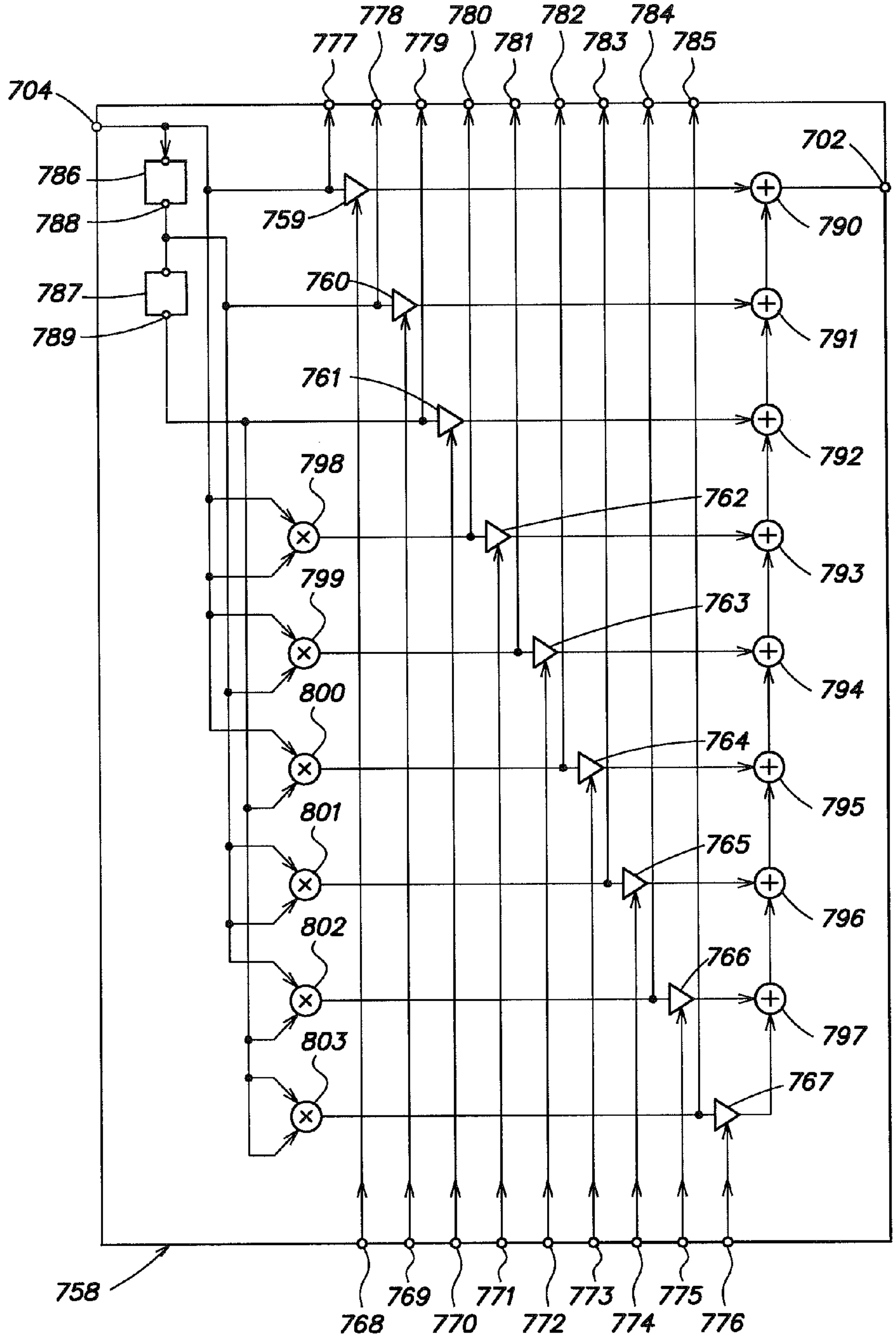
FIG. 21 illustrates a second-order polynomial filter with additional outputs for the gradient signals and additional inputs for controlling the filter parameters in the non-linear filter according to FIG. 19.

FIG. 21 shows for example a time-discrete second-order polynomial filter with two delay elements 786, 787. The signal at the filter input 704 is input to delay elements 786, 787, which are connected in series, to multipliers 798-803, which multiply the signals at input 704 and output 788 and 789 in all possible combinations. The linear signals at the input 704 and all the outputs 788, 789 and the non-linear signal at the outputs of the multipliers 798-803 are scaled by the amplifier 759-767 and summed by the adders 790-797. The linear and non-linear signals at the input of the amplifiers 759-767 are supplied as gradient signals via the outputs 777-785 of the filter to the controller 724. The gain of the amplifiers 759-767 is controlled by the inputs 768-776.

The transducer oriented filter (mirror filter) can either be transformed or at least approximated by the basic structure depicted in FIG. 20 to make the parameter adjustment adaptive. The mirror filter has a block-structure containing linear dynamic systems and static non-linear systems. To adjust the non-linear parameters the static non-linear blocks can be realized by a series expansion (e.g. Taylor series) or any other non-linear structure using a linear combiner at the output (e.g., neural networks). The linear blocks can be implemented as linear transversal filter with unit delays (FIR-filter) or with general transfer functions (GAMMA-filter) that provide the required linear combiner structure.

Figure 22:
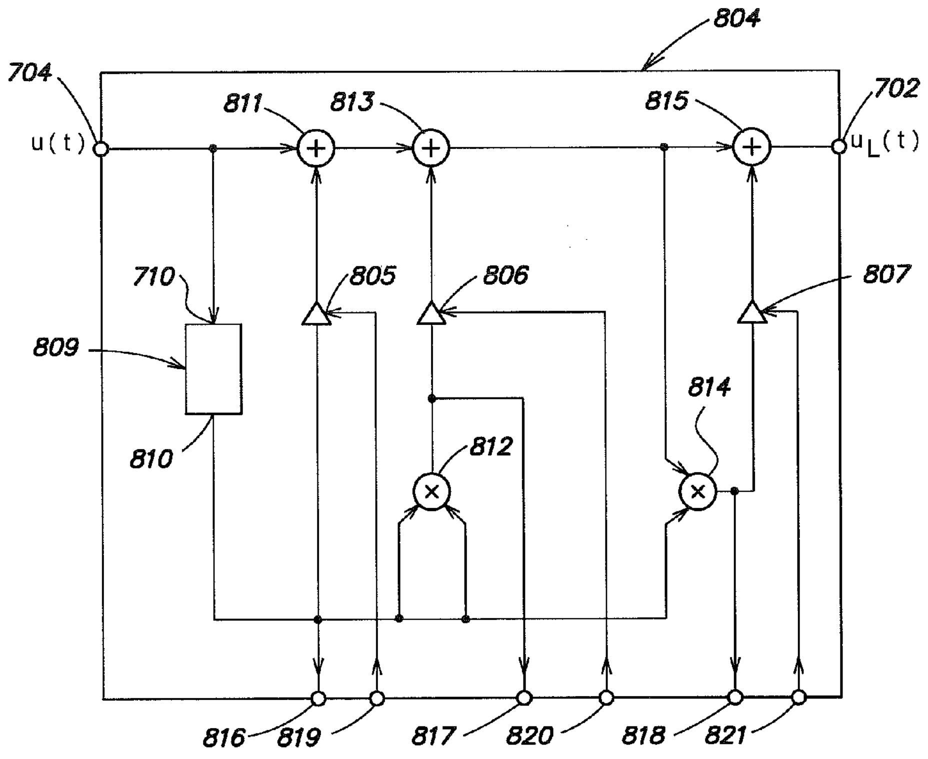
FIG. 22 illustrates a transducer oriented filter (mirror filter) with outputs for the gradient signals and inputs for controlling the filter parameters in the non-linear filter according to FIG. 19.

FIG. 22 shows a transducer oriented filter 804 to compensate for the second-order non-linear distortions caused by displacement varying stiffness of the suspension and displacement varying force-factor describing the electrodynamic drive. This filter also allows correction of the linear transfer behavior by changing the cut-off frequency of the total system. This correction circuit 804 contains only one linear filter 809. This filter transforms the electric signal at input 704 to a signal that is equivalent to the displacement x(t) of the voice coil.

The output 810 of the linear filter 809 is connected to the static non-linearities that are implemented in the transducer oriented filter 804 by multipliers and amplifiers based on a power-series-expansion truncated after the linear term. Scaling the displacement signal by amplifier 805 and adding this signal to the input signal by summer 811 correspond with the constant term in the Taylor-expansion of the stiffness non-linearity. This parameter allows correction of the constant stiffness of the transducer virtually and effects the cut-off frequency of the total system. The linear term of the stiffness non-linearity is realized by squaring the displacement signal x(t) by multiplier 812, scaling the squared signal by amplifier 806 and adding this signal to the input signal by summer 813.

A control signal at input 820 compensates for an asymmetric stiffless function of the transducer's suspension. The correction of a linear dependence of force-factor on displacement—corresponding with an asymmetric force-factor function—is realized by connecting the outputs of 809 and 813 with the inputs of the multiplier 814. The output of the multiplier 814 is supplied via amplifier 807 to the adder 815, which adds the correction signal to the electric driving signal.

All the signals at inputs of the amplifiers 805, 806, 807 are supplied via the outputs 816, 817, 818, respectively, to the controller 724. The controller updates the filter parameters and supplies a control signal via the inputs 819, 820, 821 to the control inputs of the amplifiers 805, 806, 807, respectively. The output 702 of the filter 701 is connected to the input 703 of the transducer 711.

The sensor 712 in FIG. 19 measures an acoustic, an electric or a mechanic signal at the transducer 711. The transfer of the electric signal at the transducer's terminals 703 to the sensed signal at output 713 of the sensor 712 is modelled in FIG. 20 by the parallel connection of a linear system 747 with the impulse response $h_L(t)=L^{-1}\{H_L(s)\}$ and a non-linear system 748 that produces non-linear distortions $p_D$ (t). The signal at the output 713 of the sensor 712

$$p(t)=h_L(t)\cdot u_L(t)+p_D(t) \qquad (21)$$

is the sum of the input signal UL (t) convoluted with the impulse response $h_L(t)$ and the non-linear driver distortions $P_D(t)$.

The controller 724 includes for every filter parameter $P_i$(i=1, 2, . . . , N) a sub-controller. FIG. 20 shows only one sub-controller 728 corresponding to parameter $P_j$ that comprises a multiplier 751, a circuit 753 with the system function $R_j(s)$ and a circuit 757. The error signal e(t) from the output 722 of the sensing circuit is supplied via the circuit 725 with the system function G(s) to the input 750 of the multiplier 751. The gradient signal from the output 707 is supplied via the circuit 753 to the other input 755 of the multiplier 751. The output 756 of the multiplier 751 is connected via the circuit 757 to the control input 740 of the controllable amplifier 741.

The circuit 757 performs the updating of the filter parameters with a suitable adaptive algorithm (e.g., method of steepest descent, least-mean-square (LMS) or recursive-least-squares (RLS)). The LMS-algorithm can easily be implemented and requires for the circuit 757 only an integrator or low-pass. To improve the performance of the adaptive algorithm the circuit 757 can show some non-linear function. If the amplitude of the error signal e(t) is large due to a missing signal p(t) at the output 713 of the sensor the adjustment can be interrupted and the correction filter works with stored parameters.

The circuits 725 and 753 with the system response G(s) and $R_j(s)$, respectively, have to correspond with the transfer functions of the filter 701 and the transducer-sensor-system 714 to insure a fast and stable convergence of the filter parameters. The requirements of the system responses G(s) and $R_i(s)$ shall be derived in the following:

Inserting Eqs. (20) and (21) into (19) leads to the error signal $$\begin{aligned} e(t) &= d(t) - p(t) \\ &= d(t) - p_D(t) - \sum_{i=1}^{N} P_i b_i(t) * f_i(t) * h_L(t) \end{aligned} \qquad (22)$$

which is now a function of the unknown filter parameters $P_i$. Defining a cost function $$J(t)=[g(t)\cdot e(t)]^2 \qquad (23)$$

as the squared value of the error convoluted with the impulse response $g(t)=L^{-1}\{G(s)\}$ of the system 725 the minimum of the cost function can be determined by the partial differentiation of Eq. (23)

$$\begin{aligned} \frac{\partial J(t)}{\partial P_i} &= -2[g(t) * f_i(t) * h_L(t) * b_i(t)] \times [g(t) * e(t)] \\ &= -2[r_i(t) * b_i(t)] \times [g(t) * e(t)] \quad i \in \{1, 2, \ldots, N\}. \end{aligned} \qquad (24)$$

This gradient is important for updating the filter parameter in an iterative process. The averaged gradient leads to the method of steepest descent $$P_i[n+1] = P_i[n] - \mu E\left[\frac{\partial J}{\partial P_i}\right] \quad i \in \{1, 2, \ldots, N\} \qquad (25)$$

with the positive convergence parameter .mu. and the expectation value E[ ]. In many practical applications it is advantageous to omit the averaging of the gradient and use the simpler least mean square (LMS) algorithm that requires only an integrator in 757.

Eq. (24) specifies the further elements in controller 724 shown in FIG. 20. The multiplication $$P_i[n+1] = P_i[n] - \mu\left[\frac{\partial J[n]}{\partial P_i[n]}\right] \qquad (26)$$

$$i\epsilon\{1, 2, \ldots, N\}$$

(operator x) is realized by the multiplier 750. The impulse response $r_i(t)$ $$r_i(t)=f_i(t)\cdot h_L(t)g(t) \qquad (27)$$

and the Laplace transformed system function $$R_i(s)=F_i(s)H_L(s)G(s) \qquad (28)$$

is required for all circuits in the gradient path represented in FIG. 20 by circuit 753.

If the circuit 743 and all the other corresponding circuits contained in 745 have the system function $F_i$ (s)=1 for all i=1, . . . , N, then the circuit 753 in 728 and the corresponding circuits in the other sub-controllers have the same system function $$R_i(s)=H_L(s)\cdot G(s) \tag{29}$$

Eqs. (29) and (28) show the relationship between the system functions G(s) and $R_i$ (s). There is one degree of freedom in defining the system functions G(s) and $R_i$ (s). From a practical point of view it is useful to make either G(s) or $R_i$(s) as simple as possible to realize the circuit 725 or the circuit 753 by a delay element or by a direct connection. The other circuit 753 and 725, respectively, can be realized by a linear adaptive filter to compensate for changes of the transducer parameters on-line.

In the first embodiment all circuits in the gradient signal path, represented in FIG. 20 by circuit 753, are realized by delay elements with the system function $$R_i(s)=e^{-\tau s} \tag{30}$$

The delay time τ is required to ensure that the transfer element 725 with the system function $$G(s)=\frac{e^{-\tau s}}{H_L(s)F_i(s)} \tag{31}$$

is causal and may be realized by a linear filter, called error filter.

Figure 23:
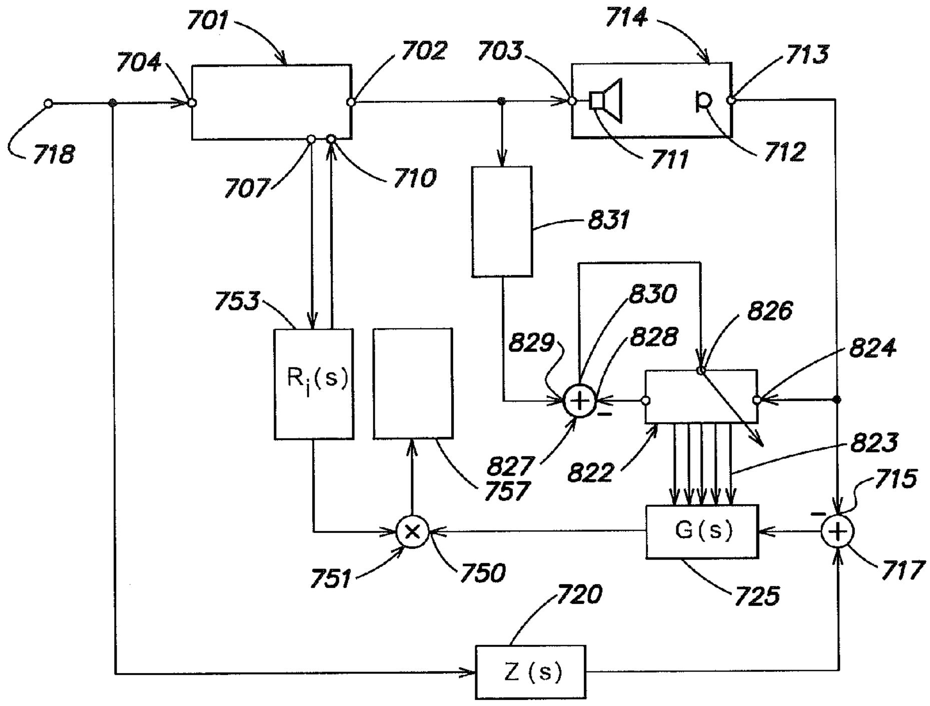
FIG. 23 is a block diagram illustration of an adaptive adjustment of the error filter in the non-linear filter according to FIG. 19.

FIG. 23 illustrates the adaptive adjustment of the linear filter 725 by inverse system identification using a model filter 822. The linear filters 725 and 822 have the same feed-forward (FIR) or recursive structure (IIR) to model the transducer in the interesting frequency range.

Only the filter 822 is adaptive using an straightforward algorithm (e.g. LMS). The electric input 703 of the transducer is connected via a delay-element 831, which has the same time delay as 753, with the non-inverting input 829 of the summer 827. The output 713 of the sensor 712 is connected via the linear adaptive filter 822 with the inverting input 828 of the summer 827. The error signal at the output 830 of the summer 827 is fed back to the error input 826 of the adaptive filter 822. The parameters of the model filter 822 are permanently copied to the filter 725 by using the connections 823.

Figure 24:
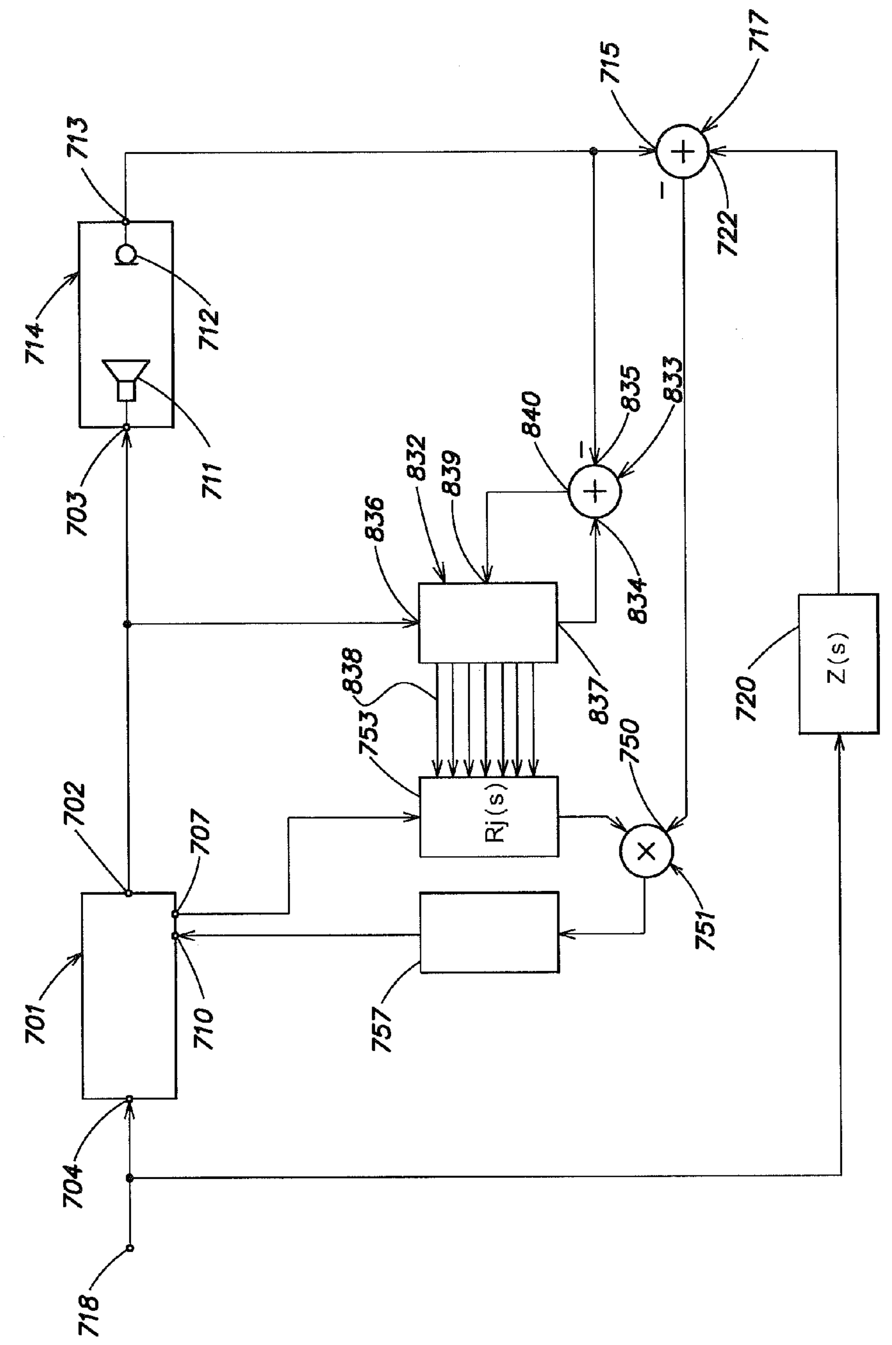
FIG. 24 is a block diagram illustration of the adaptive adjustment of the gradient filter in the non-linear filter according to FIG. 19.

The case. G(s)=1 leads to another important embodiment as shown in FIG. 24 that requires only a direct connection from the output 722 of the summer 717 to the input 750 of the multiplier 751. Every gradient path contains a linear gradient filter, represented in FIG. 24 by filter 753, with the system response $$R_i(s)=F_i(s)H_L(s). \tag{32}$$

If the $F_i$(s)=1 for all i=1, . . . , N the gradient filters in all sub-controllers 726, 727, 728, . . . have the system function $H_L$ (S) of the transducer-sensor-system. This system function is identified by an additional linear adaptive filter 832 and copied to all gradient filters represented in FIG. 24 by filter 753. The adaptive filter 832 has an additional error input 839 to supply the error signal that is required for the used updating algorithm (e.g., LMS-algorithm). The electric input 703 of the transducer 711 is connected to the input 836 of the adaptive linear filter 832 and the output 837 is combined to the non-inverting input 834 of the summer 833. The other inverting input 835 of the summer 833 is connected to the output 713 of the sensor 712. The output 840 of the summer 833 that supplies a second error signal is connected to the error input 839 of the adaptive filter 832. The parameters of the model filter 832 are permanently copied to the filter 753 by using the connections 838.

The embodiments of FIGS. 19-24 are described in greater detail in U.S. Pat. No. 5,694,476 which is incorporated herein by reference.

Figure 25:
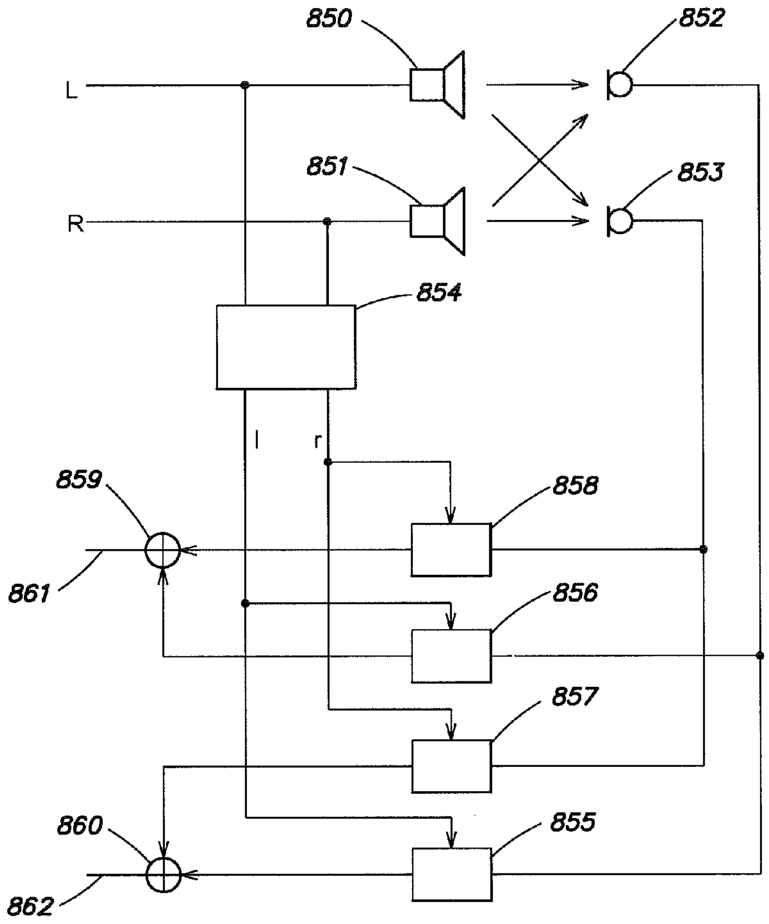
FIG. 25 is a block diagram illustration of parameter extractor for a stereo audio processing system.

FIG. 25 is a block diagram of parameter extractor for a stereo audio processing system according to the invention. As disclosed in U.S. Pat. No. 5,694,476, a sensor coupled to the respective loudspeaker may be used for extracting the parameters of this particular loudspeaker forming the basis for the non-linear loudspeaker modelling in the non-linear compensation unit. In this case the signal provided by the sensor is definitely related to this particular loudspeaker without any relevant noise signals added. However, for each loudspeaker an additional sensor, (e.g., a microphone) is necessary. In contrast, the parameter extractor of FIG. 25 makes use of two microphones 852, 853 only, namely the microphones also used for the linear compensation unit so that no additional microphones are required.

For the sake of simplicity, the embodiment shown in FIG. 25 comprises only two loudspeakers 850, 851 but can be adapted easily to three and more loudspeakers (or groups of loudspeakers). The loudspeakers 850, 851 are supplied with stereo signals (i.e., a left channel signal L and right channel signal R). The signals R and L are also fed into a signal separator unit 854 that generates two output signals r and l being representative for signals occurring only in one of both channels, either the left channel or the right channel. In the specific embodiment of FIG. 25 the signal l represents components of the stereo signal that are exclusively present in the left channel (loudspeaker 850) and, accordingly, signal r represents components which are exclusively present in the right channel (loudspeaker 851). The separation process may include a comparison of the left channel signal L and right channel signal R in the time and/or frequency domain.

The signals from the microphones 852, 853 are fed into transmission gates 855, 856, and 857, 858 respectively which are controlled by the signals r (transmission gates 856, 858) and l (transmission gates 855, 857) in such way that only components of the microphone signals corresponding to signals r and l are transmitted. Transmission gates may be adaptive filters, correlators, or in some cases just simple switches. The signals corresponding to the signals r (transmission gates 856, 858) and l (transmission gates 855, 857) are summed up by summers 859, 860 in order to generate control signals 861, 862 for the non-linear compensation unit.

The illustrations have been discussed with reference to functional blocks identified as modules and components that are not intended to represent discrete structures and may be combined or further sub-divided. In addition, while various embodiments of the invention have been described, it will be apparent to those of ordinary skill in the art that other embodiments and implementations are possible that are within the scope of this invention. Accordingly, the invention is not restricted except in light of the attached claims and their equivalents.

What is claimed is:

1. An audio processing system for controlling the acoustics of a loudspeaker-room system that includes a listening room and first and second loudspeakers located within the room, where the loudspeaker-room system is characterized by transfer functions with linear and non-linear components, the audio processing system comprising:

a dynamic compensator that is responsive to two stereo input signals, to process and provide linear and non-linear dynamic compensation to the stereo input signals inverse to linear and non-linear dynamics of the loudspeaker-room system including the listening room and the first and the second loudspeakers, and that provides first and second compensated loudspeaker signals, where the linear and the non-linear dynamic compensation is provided as a function of the two stereo input signals;

where the first and the second loudspeakers receive the first and the second compensated loudspeaker signals, respectively, and provide audio output in response.

2. The audio processing system of claim 1, where at least two microphones are located within the listening room for providing feedback signals to the dynamic compensator, and where the number of sets of loudspeakers is equal to or higher than the number of microphones.

3. The audio processing system of claim 1, where the dynamic compensator comprises a linear compensation unit with linear transfer functions forming the linear components of the transfer functions of the dynamic compensator;

where the linear compensation unit includes means for providing cross-talk cancellation in the two input signals and includes difference filter means for filtering a difference of the two input signals to obtain a first filtered signal and sum filter means for filtering a sum of the two input signals to obtain a second filtered signal; and where the linear compensation unit further comprises summing and differencing means for generating a sum output signal and a difference output signal respectively from the filtered signals, and for generating at least one additional different output signal from the filtered signals, and further including means for producing compensated signals from the filtered signals.

4. The audio processing system of claim 3, where the dynamic compensator comprises means for reformatting stereo audio signals into binaural signals.

5. The audio processing system of claim 4, where the stereo audio signals are conventional stereo signals having a predetermined loudspeaker bearing angle, and where the difference filter means and the sum filter means comprise means for reformatting the binaural signals into output signals which simulate a selected loudspeaker bearing angle different from the predetermined loudspeaker bearing angle.

6. The audio processing system of claim 3, where the sum filter means and the difference filter means each comprise minimum phase filters.

7. The audio processing system of claim 3, where the means for providing cross-talk cancellation comprises naturalization means for providing naturalization compensation of the stereo input signals to correct for propagation path distortion, where the naturalization means comprises two substantially identical minimum phase filters to compensate each of the input signals.

8. The audio processing system of claim 3, where the difference filter means and the sum filter means have a predetermined deviation from reciprocals of corresponding difference and sum head related transfer functions, the deviation being introduced to avoid representing transfer functions peculiar to specific heads to provide compensation suitable for a variety of listener's heads.

9. The audio processing system of claim 3 where the difference filter means and the sum filter means have a predetermined deviation from reciprocals of corresponding difference and sum head related transfer functions, the deviation in crosstalk cancellation being imposed gradually and being slight at a predetermined starting frequency and becoming more substantial at higher frequencies.

10. The audio processing system of claim 3, where the means for providing crosstalk cancellation further comprises means for non-symmetrical compensation of the output signals.

11. The audio processing system of claim 10, where the means for non-symmetrical compensation comprises equalization means for providing non-symmetrical equalization adjustment of one of the output signals relative to a second uncompensated one of the output signals using head-diffraction data for a selected bearing angle to provide a virtual loudspeaker position.

12. The audio processing system of claim 10, where the means for non-symmetrical compensation further comprises means for non-symmetrical delay and a level adjustment of the output signals.

13. The audio processing system of claim 3, where the loudspeakers are arranged in three sets of loudspeakers, where the output means comprises means for providing two side loudspeaker outputs from the first filtered signal, where one of the side loudspeaker outputs is a polarity reversed version of the other side loudspeaker output, and where a center loudspeaker output is produced from the second filtered signal.

14. The audio processing system of claim 3, where the loudspeakers are arranged in four sets of loudspeakers, where the output means comprises means for providing two side loudspeaker output signals from the first filtered signal, where one of the side loudspeaker output signals is a polarity reversed version of the other side loudspeaker output signal, and further including means for producing a center loudspeaker output which comprises means for producing first and second center loudspeaker output signals from the second filtered signal, where each of the first and second center loudspeaker output signals is substantially similar to one another.

15. The audio processing system of claim 3, further comprising:

means for selecting a level of contribution of the second filtered signal to a center loudspeaker output signal;

means for altering the filtering of the second filtered signal to form a third filtered signal; and means for selecting a level of contribution of the third filtered signal to two side loudspeaker output signals complementary to a corresponding contribution in the center loudspeaker output signal, where a contribution of the third filtered signal comprises together with the first filtered signal the two side loudspeaker output signals.

16. The audio processing system of claim 15, where the means for selecting a level of contribution is frequency dependent in relation to responses of transmission paths of loudspeaker outputs to avoid extremes of compensation.

17. The audio processing system of claim 2, where the dynamic compensator comprises a linear compensation unit with linear transfer functions forming the linear components of the transfer functions of the dynamic compensator, and where the linear compensation unit comprises at least two adaptive filters controlled by the feedback signals.

18. The audio processing system of claim 2, where the dynamic compensators comprise a non-linear compensation unit with non-linear transfer functions forming the non-linear components of the transfer functions of the dynamic compensator, where the non-linear compensation unit comprises at least two non-linear loudspeaker-modelling modeling units.

19. The audio processing system of claim 2, where the dynamic compensator comprises a non-linear compensation unit with non-linear transfer functions forming the non-linear components of the transfer functions of the dynamic compensator, where the non-linear compensation unit comprises at least two non-linear loudspeaker modeling units controlled by the feedback signals.

20. The audio processing system of claim 18, where the non-linear compensation unit comprises a loudspeaker modeling filter with controllable filter parameters.

21. The audio processing system of claim 1, where the dynamic compensator comprises a non-linear compensation unit with non-linear transfer functions forming the non-linear components of the transfer functions of the dynamic compensator, where the non-linear compensation unit comprises:

a correction filter that introduces non-linear transfer functions in the two input signals, where the correction filter comprises filter parameters, inputs for controlling the filter parameters, and a gradient output for providing a gradient signal;

a sensing unit that comprises error outputs for providing error signals having an amplitude, where the error signals correspond to the deviation of the instantaneous non-linear transfer function of the correction filter connected with one of the sets of loudspeakers from the non-linear component of the desired overall transfer function; and a controller having error inputs connected to the error outputs of the sensing unit and having for every filter parameter of the correction filter a gradient input and a control output, where each of the gradient inputs being connected to a corresponding one of the gradient outputs and each of the controller outputs being connected to a corresponding one of the control inputs for generating a control signal to adjust adaptively the corresponding filter parameters of the correction filter and for reducing the amplitude of the error signals.

22. The audio processing system of claim 2, where the dynamic compensator comprises a non-linear compensation unit with non-linear transfer functions forming the non-linear components of the transfer functions of the dynamic compensator, where the non-linear compensation unit comprises:

a correction filter that introduces non-linear transfer functions in the two input signals, where the correction filter comprises filter parameters, inputs for controlling the filter parameters, and a gradient output for providing a gradient signal;

a sensing unit that comprises error outputs for providing error signals having an amplitude, where the error signals correspond to the deviation of the instantaneous non-linear transfer function of the correction filter connected with one of the sets of loudspeakers from the non-linear component of the desired overall transfer function, and where the sensing unit is supplied with the feedback signal provided by the at least two microphones; and a controller having error inputs connected to the error outputs of the sensing unit and having for every filter parameter of the correction filter a gradient input and control output, where each of the gradient inputs being connected to a corresponding one of the gradient outputs and each of the controller outputs being connected to a corresponding one of the control inputs for generating a control signal to adjust adaptively the corresponding filter parameters of the correction filter and for reducing the amplitude of the error signals.

23. The audio processing system of claim 22, where the controller comprises for every filter parameter of the correction filter one update unit having a first update input and a second update input and an update output, where the update output is connected via the controller output to the control input for adjusting the corresponding filter parameters of the correction filter.

24. The audio processing system of claim 23, where the controller further comprises for every filter parameter of the correction filter one gradient filter having an input and an output;

where the gradient inputs are connected via the gradient filters to the first update inputs for providing filtered gradient signals to the update unit and for adjusting the filter parameters; and where the error inputs are connected to the second update inputs for providing the error signals for the update unit.

25. The audio processing system of claim 23, where the controller further comprises an error filter having an input connected to the error input and an output connected to the second update input for providing a filtered error signal for the update unit contained in the controller; and where each of the gradient inputs is connected to a corresponding one of the first update inputs of the update unit for adjusting the filter parameters.

26. The audio processing system of claim 23, where the controller further comprises an error filter having an input connected to the error input and an output connected to the second update input for providing a filtered error signal for all the update unit contained in the controller; where the controller further comprises for each one of the filter parameters one gradient filter having an input and an output; and where each one of the gradient inputs is separately connected via the gradient filter to the first update input for providing a filtered gradient signal to the corresponding update unit and for adjusting the filter parameter.

27. The audio processing system of claim 23, where the update unit comprises:

a multiplier having a first input connected to the first update input, a second input connected to the second update input, and a multiplier output for providing the product of the first and second inputs to the multiplier; and an integrator having an input connected to the multiplier output and an output connected to the output of the update unit for realizing a Least-Mean-Square update algorithm.

28. The audio processing system of claim 24, where the controller further comprises:

a linear adaptive filter having a model filter input, a model filter output and a model filter error input for adaptively modeling the loudspeaker-room system, the model filter input being connected to the input of one of the loudspeakers;

a summer having an inverting and a non-inverting input and a summer output for producing a second error signal, the output of the linear adaptive filter being connected to one input of the summer, the output of the loudspeaker-room system being connected to the other input of the summer and the summer output being connected to the model filter error input; and connections from the linear adaptive filter to the gradient filter for copying the parameters of the linear adaptive filter to each one of the gradient filters contained in the controller and for adaptively compensating for the transfer function of the loudspeaker-room system on-line.

29. The audio processing system of claim 25, where the controller further comprises:

a linear adaptive filter having a model filter input, a model filter output and a model filter error input for adaptively modeling the inverse loudspeaker-room system, the model filter input being connected to the output of the loudspeaker-room system;

a summer having an inverting and a non-inverting input and a summer output for producing a second error signal, the model filter output being connected to one input of the summer, the input of one of the loudspeakers being connected to the other input of the summer and the summer output being connected to the model filter error input; and connections from the linear adaptive filter to the error filter for copying the parameters of the linear adaptive filter into the error filter and for adaptively compensating the transfer function of the loudspeaker-room system online.

30. The audio processing system of claim 27, where the controller further comprises:

a linear adaptive filter having a model filter input, a model filter output and a model filter error input for adaptively modeling the inverse loudspeaker-room system without dedicated off-line pre-training, the model filter input being connected to the output of the loudspeaker-room system;

a delay circuit having an input and an output for delaying the input signal of one of the loudspeakers;

a summer having an inverting and a non-inverting input and a summer output for producing a second error signal, the model filter output being connected to one input of the summer, the input of the loudspeaker being connected via the delay circuit to the other input of the summer and the summer output being connected with the model filter error input; and connections from the linear adaptive filter to the error filter for copying the parameters of the linear adaptive filter into the error filter and for adaptively compensating the transfer function of the loudspeaker-room system online.

31. The audio processing system of claim 23 where the sensing unit further comprises:

a reference filter having an input connected to the filter input and a reference filter output for producing a desired signal from the input signal;

a sensor having a sensor output for providing a mechanic, an acoustic or an electric signal of one of the loudspeakers; and a summer having an inverting input connected to the sensor output, a non-inverting input connected to the reference filter output and an output connected to the error output for providing the error signal for the controller.

32. The audio processing system of claim 23, where the correction filter further comprises:

an input unit having an input connected to the filter input and having for each one of the filter parameters an output connected to a corresponding one of the gradient outputs for providing a gradient signal;

a controllable amplifier for each one of the filter parameters having a signal input also connected to the output of the input unit, a gain control input connected to the control input and an amplifier output for providing a scaled gradient signal; and a output unit having an input for each one of the filter parameters and an output connected to the filter output, each one of the amplifier outputs being connected to corresponding input of the output unit;

a sensing unit having an error output for providing an error signal, the error signal describing the deviation of the instantaneous overall transfer function of the filter connected with the loudspeaker from the desired overall transfer function; and a controller having an error input connected to the error output, the controller also having for each one of the filter parameters a gradient input and control output, each one of the gradient inputs being connected to corresponding the gradient output and every the controller output being connected to a corresponding the control input for generating a control signal to adjust adaptively corresponding the filter parameter and for reducing the amplitude of the error signal.

33. An audio processing method for controlling the acoustics of a loudspeaker-room system that includes a listening room and loudspeakers located within the listening room, where the loudspeaker-room system is characterized by transfer functions with linear and non-linear components, the audio processing method comprising:

obtaining at least two compensated signals from two stereo input signals according to transfer functions, where the transfer functions have linear and non-linear components that are inverse to the transfer functions of the loudspeaker-room system that includes the listening room and the loudspeakers within the listening room; and producing output signals from at least two of the compensated signals, where the output signals are fed to the loudspeakers;

where the transfer functions for the obtaining of the compensated signals are provided as functions of the two stereo input signals.

34. The audio processing method of claim 33, where at least two microphones are located within the listening room for providing feedback signals, and where the number of sets of loudspeakers is higher than the number of microphones.

35. The audio processing method of claim 33, further comprising:

cross-talk cancelling the two input signals by filtering a difference of the two input signals to obtain a first filtered signal and filtering a sum of the two input signals to obtain a second filtered signal;

generating a sum output signal and a difference output signal respectively from the filtered signals, and generating at least one additional different output signal from the filtered signals; and producing compensated signals from the filtered signals.

36. The audio processing method of claim 35, where the step of providing two input signals comprises reformatting stereo audio signals into binaural signals.

37. The audio processing method of claim 36, where the stereo audio signals are conventional stereo signals having a predetermined loudspeaker bearing angle, and where the binaural signals are reformatted into output signals which simulate a selected loudspeaker bearing angle different from the predetermined loudspeaker bearing angle.

38. The audio processing method of claim 35, where the sum and the difference filtering steps include minimum phase filtering.

39. The audio processing method of claim 35, where the step of cross-talk cancelling includes providing naturalization compensation of the input signals to correct for propagation path distortion comprising two substantially identical minimum phase filtering steps to compensate each of the input signals.

40. The audio processing method of claim 35, where difference filtering and sum filtering steps have a predetermined deviation from reciprocals of corresponding difference and sum head related transfer functions, the deviation being introduced to avoid representing transfer functions peculiar to specific heads to provide compensation suitable for a variety of listener's heads.

41. The audio processing method of claim 35, where the difference filtering and the sum filtering steps have a predetermined deviation from reciprocals of corresponding difference and sum head related transfer functions, the deviation being imposed gradually and being slight at a predetermined starting frequency and becoming more substantial at higher frequencies.

42. The audio processing method of claim 35, where the step of crosstalk cancelling further comprises the step of non-symmetrical compensation of the output signals.

43. The audio processing method of claim 42, where the step of non-symmetrical compensation comprises equalization for providing non-symmetrical equalization adjustment of one of the output signals relative to a second uncompensated one of the output signals using head-diffraction data for a selected bearing angle to provide a virtual loudspeaker position.

44. The audio processing method of claim 43, where the step of non-symmetrical compensation further comprises non-symmetrical delaying and level adjusting of the output signals.

45. The audio processing method of claim 35, where the loudspeakers are arranged in three sets of loudspeakers, the method further comprises producing two side loudspeaker outputs from the first filtered signal, where one of the side loudspeaker outputs is a polarity reversed version of the other side loudspeaker output, and where a center loudspeaker output is produced from the second filtered signal.

46. The audio processing method of claim 35, where the loudspeakers are arranged in four sets of loudspeakers, the method further comprises producing two side loudspeaker output signals from the first filtered signal, where one of the side loudspeaker output signals is a polarity reversed version of the other side loudspeaker output signal, and where a step of producing a center loudspeaker output comprises producing first and second center loudspeaker output signals from the second filtered signal, where each of the first and second center loudspeaker output signals is substantially similar to one another.

47. The audio processing method of claim 35, further comprising:

selecting a level of contribution of the second filtered signal to a center loudspeaker output signal;

altering the filtering of the second filtered signal to form a third filtered signal; and selecting a level of contribution of the third filtered signal to two side loudspeaker output signals complementary to a corresponding contribution in the center loudspeaker output signal, where a contribution of the third filtered signal comprises together with the first filtered signal the two side loudspeaker output signals.

48. The audio processing method of claim 47, where the step of selecting a level of contribution is frequency dependent in relation to responses of transmission paths of loudspeaker outputs to avoid extremes of compensation.

49. The audio processing method of claim 34, where the compensation step comprises a linear compensation step with linear transfer functions forming the linear components of the transfer functions of the compensation means, and where the linear compensation step comprises at least two adaptive filtering steps controlled by the feedback signals.

50. The audio processing method of claim 34, where the compensation step comprises a non-linear compensation step with non-linear transfer functions forming the non-linear components of the transfer functions, where the non-linear compensation step comprises at least two adaptive filtering steps controlled by the feedback signals.

51. The audio processing method of claim 34, where the compensation step comprises a non-linear compensation step with non-linear transfer functions forming the non-linear components of the transfer functions, where the non-linear compensation step comprises at least two non-linear loudspeaker modeling steps controlled by the feedback signals.

52. The audio processing method of claim 51, where the non-linear compensation step comprises loudspeaker modeling filtering with controllable filter parameters.

53. The audio processing method of claim 33, where the compensation step comprises a non-linear compensation step with non-linear transfer functions forming the non-linear components of the transfer functions, where the non-linear compensation step comprises:

a correction filtering step with non-linear transfer functions that introduces non-linear transfer functions in the two input signals, where the correction filtering step comprises filter parameters, inputs for controlling the filter parameters, and a gradient output for providing a gradient signal;

a sensing step for providing error signals having an amplitude, where the error signals correspond to the deviation of the instantaneous non-linear transfer function of the correction filtering for one of the sets of loudspeakers from the non-linear component of the desired overall transfer function; and a controlling step with error inputs being formed by the error outputs of the sensing step and having for every filter parameter of the correction filtering step a gradient input and control output, where each of the gradient inputs is formed by a corresponding one of the gradient outputs and each of the controller step outputs being fed to a corresponding one of the control inputs for generating a control signal to adjust adaptively the corresponding filter parameters of the correction filtering step and for reducing the amplitude of the error signal.

54. The audio processing method of claim 34, where the compensation step comprises a non-linear compensation step with non-linear transfer functions forming the non-linear components of the transfer functions of the compensation step, where the non-linear compensation step comprises:

a correction filtering step with non-linear transfer functions that introduces the non-linear transfer functions in the two input signals, where the correction filtering step comprises filter parameters, inputs for controlling the filtering parameters, and a gradient output for providing a gradient signal;

a sensing step that comprises error outputs for providing error signals having an amplitude, where the error signals corresponds to the deviation of the instantaneous non-linear transfer function of the correction filtering step supplied to one of the sets of loudspeakers from the non-linear component of the desired overall transfer function, and where the sensing step is supplied with the feedback signal provided by the at least two microphones are located within the listening room; and a controller step having error inputs formed by the error outputs of the sensing step and having for every filter parameter of the correction filter a gradient input and control output, where each of the gradient inputs being supplied to a corresponding one of the gradient outputs and each of the controller step outputs being supplied to a corresponding one of the control inputs for generating a control signal to adjust adaptively the corresponding filter parameters of the correction filtering step and for reducing the amplitude of the error signal.

55. The audio processing method of claim 53, where the controller step comprises for every filter parameter of the correction filtering step one update step having a first update input and a second update input and an update output, where the update output is supplied via the controller step output to the control step input for adjusting the corresponding filter parameters of the correction filtering step.

56. The audio processing system of claim 55, where the controller step further comprises for every filter parameter of the correction filtering step one gradient filtering step having an input and an output;

where the gradient inputs are supplied via the gradient filters by the first update inputs for providing filtered gradient signals to the update step and for adjusting the filter parameters; and where the error inputs are supplied by the second update inputs for providing the error signals for the update step.

57. The audio processing system of claim 55, where the controller step further comprises an error filter having an input connected to the error input and an output connected to the second update input for providing a filtered error signal for the update unit contained in the controller; and where each of the gradient inputs is connected to a corresponding one of the first update inputs of the update unit for adjusting the filter parameters.

58. The audio processing method of claim 53, where the controller step further comprises an error filtering step having an error input and an output supplied by the second update input for providing a filtered error signal for all the update steps performed in the controller step;

where the controller step also comprises for each one of the filter parameters one gradient filter having an input and an output; and where each one of the gradient inputs is separately supplied via the gradient filter to the first update input for providing a filtered gradient signal to corresponding the update step and for adjusting the filter parameter.

59. The audio processing method of claim 55, where the update step comprises:

a multiplying step having a input supplied to the first update input, another input supplied to the second update input and a multiplying step output for providing the product of both input signals; and an integration step having an input supplied to the multiplying step output and an output supplied to the output of the update step for realizing a Least-Mean-Square update algorithm.

60. The audio processing method of claim 56, where the controller step also comprises:

a linear adaptive filtering step having a model filter input, a model filter output and a model filter error input for adaptively modeling the loudspeaker-room system, the model filter input being supplied to the input of one of the loudspeakers;

a summing step having an inverting and a non-inverting input and a summing step output for producing a second error signal, the output of the linear adaptive filtering step being supplied to one input of the summing step, the output of the loudspeaker-room system being connected to the other input of the summer and the summer output being connected to the model filter error input; and a copying step copying the parameters of the linear adaptive filter to every the gradient filter contained in the controller and for adaptively compensating for the transfer function of the loudspeaker-room system on-line.

61. The audio processing method of claim 57, where the controller step also comprises a linear adaptive filtering step having a model filter input, a model filter output and a model filter error input for adaptively modeling the inverse loudspeaker-room system, the model filter input being supplied by the output of the loudspeaker-room system;

a summing step having an inverting and a non-inverting input and a summing step output for producing a second error signal, the model filter output being supplied to one input of the summing step, the electric input of the loudspeaker being supplied by the other input of the summing step and the summing step output being supplied to the model filter error input; and copying step for copying the parameters of the linear adaptive filtering step into the error filtering step and for adaptively compensating the transfer function of the loudspeaker-room system on-line.

* * * * *

UNITED STATES PATENT AND TRADEMARK OFFICE

CERTIFICATE OF CORRECTION

PATENT NO. : 8,340,317 B2
APPLICATION NO. : 10/842056
DATED : December 25, 2012
INVENTOR(S) : Gerhard Pfaffinger et al.

It is certified that error appears in the above-identified patent and that said Letters Patent is hereby corrected as shown below:

Column 24
Lines 3-4, please delete “the paths A and taken” and insert -- the paths A and S taken --

Column 33
Line 2, please delete “loudspeaker-modelling modeling units” and insert -- loudspeaker-modeling units --

Signed and Sealed this
Nineteenth Day of February, 2013

Teresa Stanek Rea
*Acting Director of the United States Patent and Trademark Office*